United States Patent
Xu et al.

(10) Patent No.: US 9,826,506 B2
(45) Date of Patent: *Nov. 21, 2017

(54) BROADCAST AND SYSTEM INFORMATION FOR MACHINE TYPE COMMUNICATION

(71) Applicant: QUALCOMM Incorporated, San Diego, CA (US)

(72) Inventors: Hao Xu, San Diego, CA (US); Wanshi Chen, San Diego, CA (US); Peter Gaal, San Diego, CA (US); Tingfang Ji, San Diego, CA (US); Miguel Griot, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/217,917

(22) Filed: Jul. 22, 2016

(65) Prior Publication Data

US 2016/0345296 A1 Nov. 24, 2016

Related U.S. Application Data

(63) Continuation of application No. 14/150,248, filed on Jan. 8, 2014, now Pat. No. 9,432,797.

(Continued)

(51) Int. Cl.
*H04W 72/00* (2009.01)
*H04W 4/00* (2009.01)
(Continued)

(52) U.S. Cl.
CPC ....... *H04W 72/005* (2013.01); *H04L 41/0866* (2013.01); *H04W 4/005* (2013.01);
(Continued)

(58) Field of Classification Search
CPC ... H04W 72/005; H04W 4/005; H04W 24/02; H04W 28/18; H04W 48/10; H04W 48/16;
(Continued)

(56) References Cited

U.S. PATENT DOCUMENTS

| 8,185,726 | B2 | 5/2012 | Taha et al. |
| 8,433,308 | B2 | 4/2013 | Chen |

(Continued)

FOREIGN PATENT DOCUMENTS

| EP | 2369883 A1 | 9/2011 |
| JP | 2013157699 A | 8/2013 |

(Continued)

OTHER PUBLICATIONS

ISA/EPO, International Search Report and the Written Opinion of the International Searching Authority, Int'l App. No. PCT/US2014/010795, dated Apr. 28, 2014, European Patent Office, Rijswijk, NL, 12 pgs.

(Continued)

*Primary Examiner* — Duc C Ho
(74) *Attorney, Agent, or Firm* — Anthony R. Morris

(57) ABSTRACT

Methods, systems, and devices are described for facilitating Machine Type Communication in a wireless communications system. Link budget-limited MTC devices, may be supported. An MTC physical broadcast channel may be utilized for the Machine Type Communication. The MTC physical broadcast channel may be transmitted over one or more subframes different from a regular physical broadcast channel. The payload for the MTC physical broadcast channel may be reduced. The MTC physical broadcast channel may also be utilized to indicate the presence of paging and/or to indicate a change in system information. Some embodiments utilize one or more MTC-specific system information blocks. The MTC-specific system information (Continued)

blocks may combine and/or simplify multiple system information blocks. The location of the MTC system information blocks may be predetermined or information about their location may be transmitted over the MTC physical broadcast channel. An enhanced paging channel may be used to indicate system information updates.

20 Claims, 22 Drawing Sheets

Related U.S. Application Data

(60) Provisional application No. 61/752,339, filed on Jan. 14, 2013.

(51) Int. Cl.
*H04L 12/24* (2006.01)
*H04W 24/02* (2009.01)
*H04W 28/18* (2009.01)
*H04W 48/16* (2009.01)
*H04W 48/10* (2009.01)
*H04W 72/04* (2009.01)
*H04W 92/18* (2009.01)

(52) U.S. Cl.
CPC ........... *H04W 24/02* (2013.01); *H04W 28/18* (2013.01); *H04W 48/10* (2013.01); *H04W 48/16* (2013.01); *H04W 72/048* (2013.01); *H04W 92/18* (2013.01)

(58) Field of Classification Search
CPC .. H04W 72/048; H04W 92/18; H04L 41/0866
USPC .............................................. 455/450, 422.1
See application file for complete search history.

(56) References Cited

U.S. PATENT DOCUMENTS

| | | | |
|---|---|---|---|
| 8,514,745 B2 | 8/2013 | Roh et al. | |
| 8,929,306 B2 | 1/2015 | Lee | |
| 9,432,797 B2 | 8/2016 | Xu | |
| 2008/0267309 A1 | 10/2008 | Saini et al. | |
| 2009/0181661 A1 | 7/2009 | Kitazoe et al. | |
| 2009/0274086 A1* | 11/2009 | Petrovic ............... | H04J 11/0093 370/312 |
| 2010/0226389 A1 | 9/2010 | Cho et al. | |
| 2010/0260156 A1 | 10/2010 | Lee et al. | |
| 2011/0199905 A1 | 8/2011 | Pinheiro et al. | |
| 2011/0201344 A1* | 8/2011 | Ryu ....................... | H04W 4/08 455/450 |
| 2011/0269448 A1 | 11/2011 | Chen | |
| 2011/0270984 A1 | 11/2011 | Park | |
| 2011/0274040 A1 | 11/2011 | Pani et al. | |
| 2012/0004003 A1 | 1/2012 | Shaheen et al. | |
| 2012/0099663 A1 | 4/2012 | Sabol | |
| 2012/0155404 A1* | 6/2012 | Shin ...................... | H04W 60/04 370/329 |
| 2012/0220329 A1 | 8/2012 | Kitazoe et al. | |
| 2012/0327895 A1 | 12/2012 | Wallen et al. | |
| 2013/0010964 A1* | 1/2013 | Fong ...................... | H04L 5/0053 380/277 |
| 2013/0013763 A1 | 1/2013 | Chen et al. | |
| 2013/0039309 A1 | 2/2013 | Chiu | |
| 2013/0042011 A1* | 2/2013 | Sugizaki ............... | H04W 4/005 709/227 |
| 2013/0045706 A1 | 2/2013 | Hsu | |
| 2013/0077484 A1 | 3/2013 | Zhao et al. | |
| 2013/0094457 A1 | 4/2013 | Seo et al. | |
| 2013/0100895 A1* | 4/2013 | Aghili .................... | H04W 4/00 370/329 |
| 2013/0115913 A1 | 5/2013 | Lin et al. | |
| 2013/0115993 A1 | 5/2013 | Jain et al. | |
| 2013/0136098 A1 | 5/2013 | Li et al. | |
| 2013/0155954 A1 | 6/2013 | Wang et al. | |
| 2013/0163556 A1 | 6/2013 | Lee et al. | |
| 2013/0176995 A1 | 7/2013 | Park et al. | |
| 2013/0250878 A1 | 9/2013 | Sayana et al. | |
| 2013/0303203 A1* | 11/2013 | Wang .................... | H04W 68/00 455/458 |
| 2014/0011505 A1 | 1/2014 | Liao | |
| 2014/0044027 A1 | 2/2014 | Beale | |
| 2014/0086145 A1* | 3/2014 | Ramkumar ........... | H04H 20/16 370/328 |
| 2014/0092833 A1 | 4/2014 | Vannithamby et al. | |
| 2014/0098761 A1 | 4/2014 | Lee et al. | |
| 2014/0198685 A1 | 7/2014 | Xu et al. | |
| 2014/0286237 A1 | 9/2014 | Bhalla | |
| 2015/0092694 A1 | 4/2015 | You et al. | |
| 2015/0327155 A1* | 11/2015 | Lee ....................... | H04W 48/12 370/329 |

FOREIGN PATENT DOCUMENTS

| | | |
|---|---|---|
| JP | 2015537422 A | 12/2015 |
| WO | WO-2009086991 A1 | 7/2009 |
| WO | WO-2010037311 A1 | 4/2010 |
| WO | WO-2012053840 A2 | 4/2012 |
| WO | WO-2012141441 A2 | 10/2012 |
| WO | WO-2014055878 A1 | 4/2014 |

OTHER PUBLICATIONS

Samsung, "EAB Update Mechanism," 3GPP TSG RAN WG2 #76, R2-116244, San Francisco, USA, Nov. 14-18, 2011, 4 pgs., 3rd Generation Partnership Project.

ISA/EP, International Search Report and the Written Opinion of the International Searching Authority, Int'l. App. No. PCT/US2014/010789, dated Jul. 4, 2014, European Patent Office, Rijswijk, NL, 13 pgs.

* cited by examiner

BROADCAST AND SYSTEM INFORMATION FOR MACHINE TYPE COMMUNICATION

CROSS REFERENCES

The present application for patent is a continuation of U.S. patent application Ser. No. 14/150,248, entitled "Broadcast and System Information for Machine Type Communication," filed Jan. 8, 2014, which claims priority to U.S. Provisional Patent Application No. 61/752,339, entitled "Methods, Systems, and Devices for Broadcast and Paging Channels for Machine Type Communication," filed Jan. 14, 2013, assigned to the assignee hereof, and expressly incorporated by reference herein.

BACKGROUND

Machine-to-Machine (M2M) communication or Machine Type Communication (MTC) are terms that may be used to refer to data communication technologies that allow automated devices to communicate with one another without human intervention. For example, M2M and/or MTC may refer to communications from devices that integrate sensors or meters to measure or capture information, and relay that information to a central server or application. A device used in this context may be referred to as an M2M device, MTC device, and/or an MTC user equipment (UE).

MTC devices may be used in a number of different applications to, for example, collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. The market for MTC devices is expected to grow rapidly as industries such as automotive, security, healthcare, and fleet management employ MTC to increase productivity, manage costs, and/or expand customer services.

MTC devices may use a variety of wired and/or wireless communication technologies. For example, MTC devices may communicate with a network over various wireless cellular technologies and/or various wireless networking technologies (e.g., IEEE 802.11 (Wi-Fi), IEEE 802.16 (Wi-MAX), etc.). MTC devices may also communicate with one another using various peer-to-peer technologies such as Bluetooth, ZigBee, and/or other ad-hoc or mesh network technologies. The expansion of multiple access wireless networks around the world has made it far easier for MTC communication to take place and has lessened the amount of power and time necessary for information to be communicated between machines. These networks also allow an array of new business opportunities and connections between consumers and producers in terms of the products being sold.

In some cases, MTC devices may be deployed in locations that make wireless communication difficult, such as in basements. There may be a need for coverage enhancements in some cases. Transmission time interval (TTI) bundling has been employed to achieve some coverage enhancement. However, broadcast channels, such as physical broadcast channels and system information transmissions, may also need coverage enhancement. Additionally, much of the system information that is generally transmitted over broadcast channels may not be needed for MTC operations. It therefore may be beneficial to provide an MTC physical broadcast channel and/or MTC-specific system information blocks that allow MTC devices to limit the amount of unnecessary information received. It may also be beneficial to increase the efficiency with which MTC devices anticipate and decode transmissions to identify changes in system information, and to determine whether to decode certain system information.

SUMMARY

The described features generally relate to one or more systems, methods, and devices for facilitating Machine Type Communication in a wireless communications system. For example, the techniques may be utilized to support link budget-limited MTC devices, such as those located in basements. In some embodiments, an MTC physical broadcast channel may be utilized to facilitate the Machine Type Communication. The MTC physical broadcast channel may be transmitted over one or more subframes different from a regular (e.g., legacy) physical broadcast channel. The payload for the MTC physical broadcast channel may be reduced, with respect to a legacy physical broadcast channel, in some cases. The MTC physical broadcast channel may also be utilized to indicate the presence of paging and/or to indicate a change in system information.

In some embodiments, a method for facilitating Machine Type Communication in a wireless communications system includes receiving one or more MTC-specific system information blocks at an MTC device and processing the one or more MTC-specific system information blocks at the MTC device.

In some embodiments, an apparatus for facilitating Machine Type Communication in a wireless communications system includes means for receiving one or more MTC-specific system information blocks at the apparatus and means for processing the one or more MTC-specific system information blocks at the apparatus.

In some embodiments, an apparatus for facilitating Machine Type Communication in a wireless communications system includes a processor, memory in electronic communication with the processor, and instructions stored in the memory. The instructions may be executable by the processor to receive one or more MTC-specific system information blocks at the apparatus, and process the one or more MTC-specific system information blocks.

In some embodiments, a computer program product for facilitating Machine Type Communication in a wireless communications system includes a non-transitory computer readable medium storing instructions executable by a processor to receive one or more MTC-specific system information blocks at an MTC device, and process the one or more MTC-specific system information blocks at the MTC device.

In certain examples of the methods, apparatuses, and/or computer program products, the MTC-specific system information blocks may include a combination of system information included in two or more other system information blocks.

In certain examples of the methods, apparatuses, and/or computer program products, the MTC-specific system information blocks may consist of a subset of system information included in one other system information block.

In certain examples of the methods, apparatuses, and/or computer program products, the other system information block or blocks may include system information block 1 (SIB1), system information block 2 (SIB2), and/or system information block 12 (SIB12).

In certain examples of the methods, apparatuses, and/or computer program products, one or more of the MTC-specific system information blocks may include fields for: cell access information, scheduling information for other system information blocks, radio resource configuration information, MTC random access channel (RACH) configuration information, MTC paging channel configuration information, physical uplink shared channel (PUSCH) configuration information, power control, a timer, radio resource configuration information other than PUSCH configuration information, and/or sounding reference signal (SRS) configuration information.

In certain examples of the methods, apparatuses, and/or computer program products, one or more MTC-specific system information blocks may be located at one or more predetermined locations. The one or more predetermined locations may be a function of a cell ID, a cyclic prefix length, and a division duplex configuration.

In certain examples, the methods, apparatuses, and/or computer program products may include steps for, means for, and/or instructions executable by a processor for receiving information regarding one or more locations of the MTC-specific system information blocks over an MTC physical broadcast channel.

In certain examples, the methods, apparatuses, and/or computer program products may include steps for, means for, and/or instructions executable by a processor for determining a sleep time of the MTC device exceeds a time duration, and reading one of the MTC-specific system information blocks when the determined sleep time exceeds the time duration.

Further scope of the applicability of the described methods and apparatuses will become apparent from the following detailed description, claims, and drawings. The detailed description and specific examples are given by way of illustration only, since various changes and modifications within the spirit and scope of the description will become apparent to those skilled in the art.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
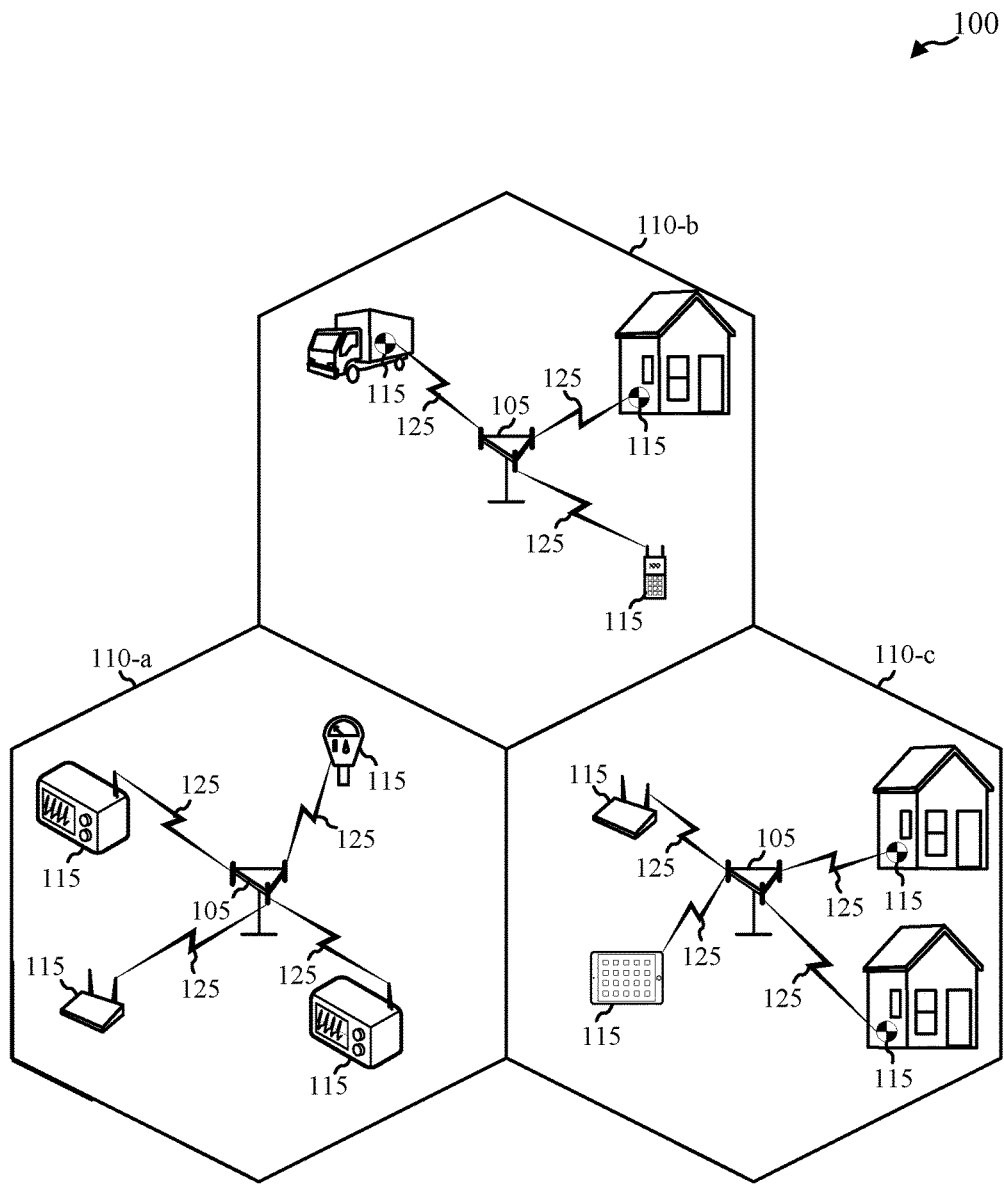
FIG. 1 shows a block diagram of a wireless communications system in accordance with various embodiments.

Systems, methods, and devices are described for facilitating Machine Type Communication in a wireless communications system. For example, the systems, methods, and/or devices may support link budget limited MTC devices, such as those MTC devices. In some embodiments, an MTC physical broadcast channel may be utilized to facilitate the Machine Type Communication. The MTC physical broadcast channel may be transmitted over one or more subframes different from a regular physical broadcast channel. The payload for the MTC physical broadcast channel may be reduced, as compared to a legacy physical broadcast channel, in some cases. The MTC physical broadcast channel may also be utilized to indicate the presence of paging and/or to indicate a change in system information.

Some embodiments utilize one or more MTC-specific system information blocks. The MTC system information blocks may combine and simplify multiple system information blocks. The location of the MTC-specific system information blocks may be predetermined or information about their location may be transmitted over the MTC physical broadcast channel. Some embodiments may also provide an enhanced paging channel that may indicate system information updates.

Some embodiments may utilize broadcast channel designs that apply to new carrier types (NCT). For example, physical broadcast channels (PBCH) and/or system information blocks (SIB) may be designed differently from legacy carrier types in accordance with various embodiments. Furthermore, for tools and techniques that may apply to NCT, some embodiments may utilize signaling of PDCCH and/or ePDCCH configurations in PBCH.

Techniques described herein may be used for various wireless communications systems such as cellular wireless systems, Peer-to-Peer wireless communications, wireless local access networks (WLANs), ad hoc networks, satellite communications systems, and other systems. The terms "system" and "network" are often used interchangeably. These wireless communications systems may employ a variety of radio technologies such as Code Division Multiple Access (CDMA), Time Division Multiple Access (TDMA), Frequency Division Multiple Access (FDMA), Orthogonal FDMA (OFDMA), Single-Carrier FDMA (SC-FDMA), and/or other radio technologies. Examples of CDMA systems include CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. Examples of TDMA systems include various implementations of Global System for Mobile Communications (GSM). Examples of OFDMA and OFDM systems include Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies.

Thus, the following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Referring first to FIG. 1, a block diagram illustrates an example of a wireless communications system 100 in accordance with various embodiments. The system 100 includes base stations 105 (or cells), communication devices 115, a base station controller 120, and a core network 130 (the controller 120 may be integrated into the core network 130). The system 100 may support operation on multiple carriers (waveform signals of different frequencies). Multi-carrier transmitters can transmit modulated signals simultaneously on the multiple carriers. For example, each modulated signal may be a multi-carrier channel modulated according to the various radio technologies described above. Each modulated signal may be sent on a different carrier and may carry control information (e.g., pilot signals, control channels, etc.), overhead information, data, etc. The system 100 may be a multi-carrier LTE/LTE-A network capable of efficiently allocating network resources.

The base stations 105 may wirelessly communicate with the devices 115 via a base station antenna (not shown). The base stations 105 may communicate with the devices 115 under the control of the base station controller 120 via multiple carriers. Each of the base station 105 sites may provide communication coverage for a respective geographic area. In some embodiments, base stations 105 may be referred to as a base transceiver station, a radio base station, a radio transceiver, a basic service set (BSS), an extended service set (ESS), a NodeB, eNodeB (eNB), Home NodeB, a Home eNodeB, or some other suitable terminology. The coverage area for each base station 105 here is identified as 110-a, 110-b, or 110-c. The coverage area for a base station may be divided into sectors (not shown, but making up only a portion of the coverage area). The system 100 may include base stations 105 of different types (e.g., macro, pico, and/or femto base stations). A macro base station may provide communication coverage for a relatively large geographic area (e.g., 35 km in radius). A pico base station may provide coverage for a relatively small geographic area (e.g., 12 km in radius), and a femto base station may provide communication coverage for a relatively smaller geographic area (e.g., 5 km in radius). There may be overlapping coverage areas for different technologies.

The devices 115 may be dispersed throughout the coverage areas 110. Each device 115 may be stationary or mobile. In one configuration, the devices 115 may be able to communicate with different types of base stations such as, but not limited to, macro base stations, pico base stations, and femto base stations.

Some of the devices 115 may be Machine Type Communication (MTC) devices 115 that perform various functions, capture information, and/or communicate information with limited or no human intervention. For example, MTC devices 115 may include sensors and/or meters for monitoring and/or tracking other devices, environmental conditions, etc. MTC devices 115 may be standalone devices or, in embodiments, MTC devices 115 may be incorporated in other devices. For example, devices such as cellular phones and wireless communications devices, personal digital assistants (PDAs), other handheld devices, netbooks, notebook computers, surveillance cameras, handled medical scanning devices, home appliances, etc. may include one or more MTC devices 115. In the ensuing description, various techniques are described as applied to communications and processing for a system including a network and one or more MTC devices. It should be understood that the described techniques may be advantageously applied to other devices such as those incorporating MTC devices and/or other wireless communication devices.

The information collected by the MTC devices 115 may be transmitted across a network that includes components of system 100 to a back-end system, such as a server. The transmission of data to/from the MTC devices 115 may be routed through the base stations 105. The base stations 105 may communicate with the MTC devices 115 on a forward link for transmitting signaling and/or information to the MTC devices 115 and a reverse link for receiving signaling and/or information from the MTC devices 115.

In one example, the network controller 120 may be coupled to a set of base stations and provide coordination and control for these base stations 105. The controller 120 may communicate with the base stations 105 via a backhaul (e.g., core network 130). The base stations 105 may also communicate with one another directly or indirectly and/or via wireless or wireline backhaul.

The different aspects of system 100, such as the MTC devices 115, the base stations 105, the core network 130, and/or the controller 120 may be configured to utilize one or more MTC physical broadcast channels. For example, the base stations 105, the core network 130, and/or the controller 120 may configure information to transmit over an MTC physical broadcast channel. The information may be transmitted over the MTC physical broadcast channel to MTC devices 115. The MTC devices 115 may be configured to receive information transmitted over an MTC physical broadcast channel. The information received over the MTC physical broadcast channel may be processed by the MTC devices 115.

The different aspects of system 100, such the MTC devices 115, the base stations 105, the core network 130, and/or the controller 120 may be configured to transmit and/or receive information that include a reduced payload for the MTC physical broadcast channel with respect to a regular physical broadcast channel. The information transmitted and/or received over the MTC physical broadcast channel may include receiving a paging indicator transmitted over the MTC physical broadcast channel. Some embodiments include transmitting and/or receiving a system information change indicator transmitted over the MTC physical broadcast channel utilizing different aspects of system 100, such the MTC devices 115, the base stations 105, the core network 130, and/or the controller 120.

In some embodiments, the system 100 is an LTE/LTE-A network. As described below, LTE/LTE-A defines numerous different system information blocks (SIBs) for conveying system information from eNBs 105 to UEs 115. Within this description, SIBs presently defined in LTE/LTE-A may be referred to as "regular system information blocks" or "other system information blocks" to distinguish them from MTC-specific system information blocks.

In some embodiments, the different aspects of system 100, such as the base stations 105, the core network 130, and/or the controller 120 may configure one or more MTC-specific system information blocks. The one or more MTC-specific system information blocks may be transmitted to and received by the MTC devices 115 where the one or more MTC-specific system information blocks may be processed. The MTC-specific system information blocks may include at least a portion from each of multiple regular system information blocks combined into at least one of the one or more MTC-specific system information blocks. In some cases, the one or more MTC-specific system information blocks may be located at one or more predetermined locations. The one or more predetermined locations may be a function of at least a cell ID, a cyclic prefix length, a division duplex configuration. The different aspects of system 100, such as the MTC devices 115, the base stations 105, the core network 130, and/or the controller 120 may be configured to transmit and/or receive information regarding one or more locations of the one or more MTC-specific system information blocks over an MTC physical broadcast channel.

In some embodiments, the different aspects of system 100, such the base stations 105, the core network 130, and/or the controller 120 may configure one or more MTC-specific system information blocks. A counter may be configured and/or transmitted over a paging channel to the MTC devices 115 to indicate a system information configuration or a change in the system information configuration. The counter may include multiple bits to reflect the system information configuration or the change in the system information. The MTC devices 115 may be configured to determine the system information configuration or a change in the system information configuration by utilizing the counter received over the paging channel.

In some embodiments, the MTC devices 115 may be configured to determine whether a sleep time of the MTC device 115 exceeds a time duration. An MTC-specific system information block may be read by the MTC devices 115 when the determined sleep time exceeds the time duration.

Figure 2A:
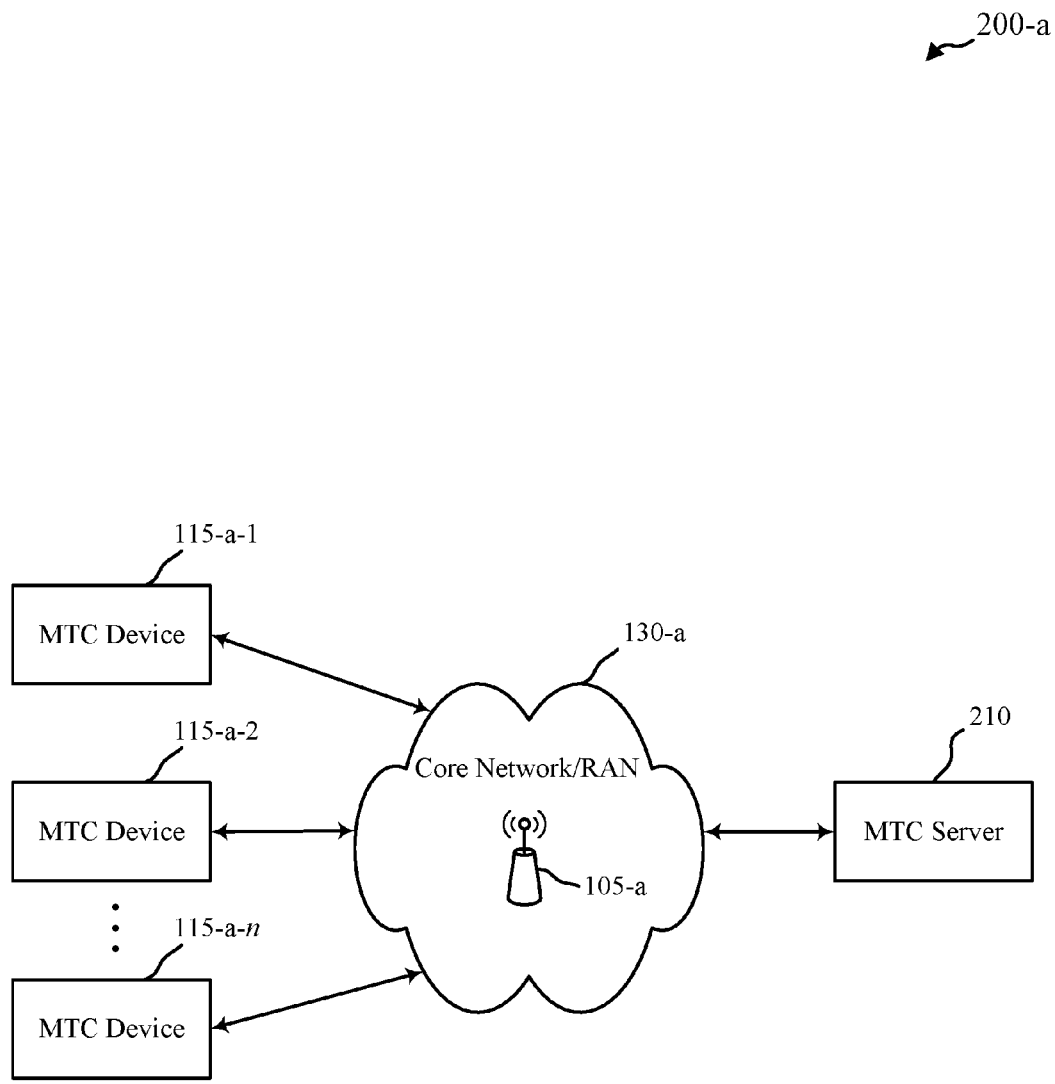
FIG. 2A illustrates an example of a wireless communication system including a radio access network or core network implementing a Machine Type Communication service in accordance with various embodiments.

FIG. 2A illustrates an example of a wireless communication system 200-a including a Radio Access Network (RAN) or Core Network 130-a implementing a machine type communication service in accordance with various embodiments. The system 200-a may include a number of MTC devices 115-a and an MTC server 210. Communications between the server 210 and MTC devices 115 may be routed through a base station 105 that may be considered part of the Core Network/RAN 130-a, which may be an example of the core network 130 of FIG. 1. The base station 105-a may be an example of the base stations illustrated in FIG. 1. The MTC devices 115-a may be examples of the MTC devices 115 illustrated in FIG. 1. One skilled in the art would understand that the quantity of MTC devices 115-a, Core Networks/RANs 130-a, and MTC servers 210 shown in FIG. 2 is for illustration purposes only and should not be construed as limiting.

The wireless communication system 200-a may be operable to facilitate Machine Type Communication between one or more MTC devices 115-a and/or one or more base stations 105-a. Machine Type Communication may include communications between one or more devices without human intervention. In one example, Machine Type Communication may include the automated exchange of data between a remote machine, such as an MTC device 115-a, and a back-end IT infrastructure, such as the MTC server 210, without user intervention. The transfer of data from an MTC device 115-a to the MTC server 210 via the Core Network/RAN 130-*a* (e.g., via the base station 105-*a*) may be performed using reverse link communications. Data collected by the MTC devices 115-*a* (e.g., monitoring data, sensor data, meter data, etc.) may be transferred to the MTC server 210 on the reverse link communications.

The transfer of data from the MTC server 210 to an MTC device 115-*a* via the base station 105-*a* may be performed via forward link communications. The forward link may be used to send instructions, software updates, and/or messages to the MTC devices 115-*a*. The instructions may instruct the MTC devices 115-*a* to remotely monitor equipment, environmental conditions, etc. Machine Type Communication may be used with various applications such as, but not limited to, utility metering, remote monitoring, measurement and condition recording, fleet management and asset tracking, in-field data collection, distribution, physical access control, and/or storage, etc. The base station 105-*a* may generate one or more forward link frames with a small number of channels to transmit instructions, software updates, and/or messages. The various MTC devices 115-*a* may wake up to monitor a specific frame when instructions or other data is included on a channel of that frame.

In some embodiments, the different aspects of system 200-*a*, such as the MTC devices 115-*a* and/or Core Networks/RANs 130-*a* may be configured to utilize one or more MTC physical broadcast channels. For example, the Core Networks/RANs 130-*a* may configure information to transmit over an MTC physical broadcast channel. The information may be transmitted over the MTC physical broadcast channel to MTC devices 115-*a*. The MTC devices 115-*a* may be configured to receive information transmitted over an MTC physical broadcast channel. The information received over the MTC physical broadcast channel may be processed by the MTC devices 115-*a*.

The different aspects of system 200-*a*, such the MTC devices 115-*a* and/or Core Networks/RANs 130-*a* may be configured to transmit and/or receive information that include a reduced payload for the MTC physical broadcast channel, where the payload is reduced with respect to a regular physical broadcast channel. The information transmitted and/or received over the MTC physical broadcast channel may include receiving a paging indicator transmitted over the MTC physical broadcast channel. Some embodiments include transmitting and/or receiving a system information change indicator transmitted over the MTC physical broadcast channel utilizing different aspects of system 200-*a*, such as the MTC devices 115-*a* and/or Core Networks/RANs 130-*a*.

In some embodiments, the different aspects of system 200-*a*, such as Core Networks/RANs 130-*a* configure one or more MTC-specific system information blocks. The one or more MTC-specific system information blocks may be transmitted to and received by the MTC devices 115 where the one or more MTC-specific system information blocks may be processed. The MTC-specific system information blocks may include at least a portion from each of several other system information blocks combined into at least one or more MTC-specific system information blocks.

In some cases, the MTC-specific system information blocks may be located at one or more predetermined locations. The predetermined locations may be a function of at least a cell ID, a cyclic prefix length, a division duplex configuration. The different aspects of system 200-*a*, such as MTC devices 115-*a* and/or Core Networks/RANs 130-*a* may be configured to transmit and/or receive information regarding one or more locations of the one or more MTC-specific system information blocks over an MTC physical broadcast channel.

In some embodiments, the different aspects of system 200-*a*, such the MTC devices 115-*a* and/or Core Networks/RANs 130-*a* may configure one or more MTC-specific system information blocks. A counter may be configured and/or transmitted to the MTC devices 115-*a* to indicate a system information configuration or a change in the system information configuration. The counter may include multiple bits to reflect the system information configuration or the change in the system information. The MTC devices 115-*a* may be configured to determine the system information configuration or a change in the system information configuration by utilizing the counter. The MTC devices 115-*a* may receive the counter over any one of several channels, including a paging channel, a PBCH, or an MTC physical broadcast channel.

In some embodiments, the MTC devices 115-*a* may be configured to determine whether a sleep time of the MTC device 115-*a* exceeds a time duration. A system information block (e.g., an MTC-specific system information block) may be read by the MTC devices 115-*a* when the determined sleep time exceeds the time duration.

Figure 2B:
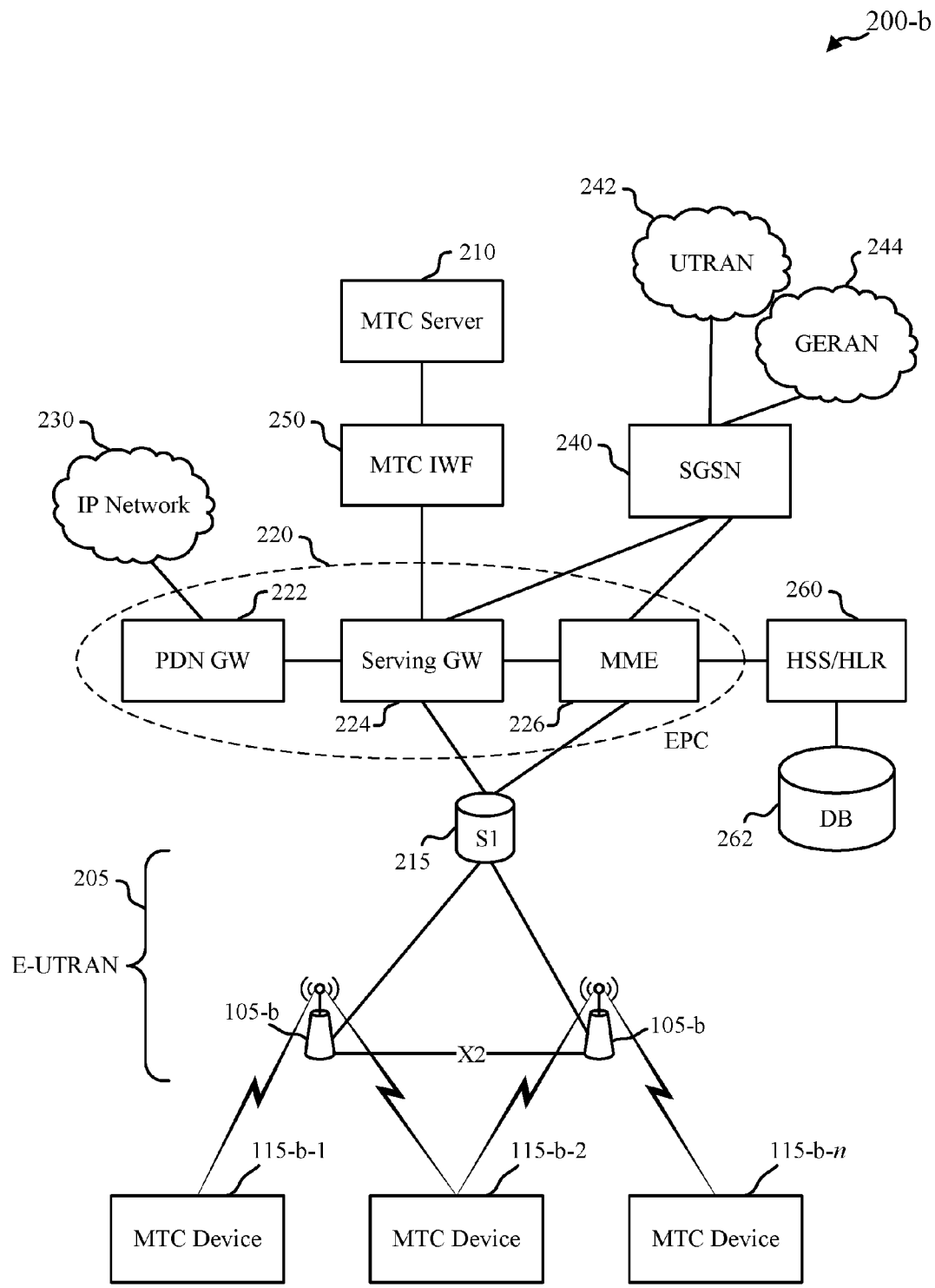
FIG. 2B illustrates an example of a wireless communications system implementing a Machine Type Communication service over an LTE/LTE-A network in accordance with various embodiments.

FIG. 2B illustrates an example of a wireless communications system 200-*b* implementing a machine type communication service over an LTE/LTE-A network in accordance with various embodiments. System 200-*b* may be an example of system 200-*a* of FIG. 2A and/or system 100 of FIG. 1. The LTE/LTE-A network may include Evolved Universal Terrestrial Radio Access Network (E-UTRAN) 205 and Evolved Packet Core (EPC) 220. The LTE E-UTRAN 205 and EPC 220 may be configured for supporting end-to-end packet-switched communications. EPC 220 may include a Packet Data Network (PDN) Gateway 222. The PDN Gateway 222 may be connected to one or more Internet Protocol (IP) Networks 230. IP Networks 230 may include Operator IP Networks as well as external IP Networks. For example, IP Networks 230 may include the Internet, one or more Intranets, an IP Multimedia Subsystem (IMS), and a PS Streaming Service (PSS). The PDN Gateway 222 may provide UE IP address allocation as well as other functions. The EPC 220 may interconnect with other access networks. For example, EPC 220 may interconnect with UTRAN 242 and/or GERAN 244 via one or more Serving GPRS Support Nodes (SGSNs) 240.

EPC 220 may include one or more Serving Gateways 224 and/or Mobility Management Entities (MME) 226. The Serving Gateway 224 may handle the interface to E-UTRAN 205 and provide a communication point for inter-RAT mobility (e.g., handover to UTRAN 242 and/or GERAN 244, etc.). Generally, the MME 226 may provide bearer and connection management while the Serving Gateway 224 may transfer user IP packets between eNBs 105 and other network end-points (e.g., PDN GW 222, etc.). For example, MME 226 may manage intra-RAT mobility functions (e.g., Serving Gateway selection) and/or UE tracking management. The Serving Gateway 224 and the MME 226 may be implemented in one physical node of EPC 220 or in separate physical nodes. A Home Subscriber Service (HSS) and/or home location register (HLR) node 260 may provide service authorization and/or user authentication for UEs. HSS/HLR node 260 may be in communication with one or more databases 262. Such service authorization and/or user authentication information may include network subscription authorization for UICCs or SIM cards associated with a number of MTC devices.

E-UTRAN 205 may include one or more base stations or eNBs 105-*b*, which provide user and control plane protocol terminations for UEs (e.g., MTC devices 115) over the air interface of the LTE network. The eNBs 105-*b* may be connected with an X2 interface for intra-eNB communication. The eNBs 105-*b* may be connected to Serving Gateway 224 and/or MME 226 over an S-1 interface 215 for communicating data traffic and/or control plane information. The MTC devices 115-*b* may be configured to collaboratively communicate with multiple eNBs 105 through, for example, Multiple Input Multiple Output (MIMO), Coordinate Multi-Point (CoMP), or other schemes as described in more detail below.

In embodiments, wireless communications network 200-*b* includes an MTC inter-working function (IWF) 250, which may provide an interface between EPC 220 and one or more external MTC Servers 210 for providing MTC service within the LTE network. MTC IWF 250 may be implemented in one or more existing physical nodes of the EPC 220 (e.g., Serving Gateway 224, etc.), or in a separate physical node connected to EPC 220.

The communication networks that may accommodate some of the various disclosed embodiments may be packet-based networks that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARD) techniques to provide retransmission at the MAC layer to ensure reliable data transmission. In the control plane, the Radio Resource Control (RRC) protocol layer may provide establishment, configuration, and maintenance of an RRC connection between the UE and the network used for the user plane data. At the Physical layer, the transport channels may be mapped to Physical channels In order to access and operate properly with an eNB 105, an MTC device 115 may need to acquire system information. System information may include information related to: uplink/downlink configuration, uplink and downlink bandwidth, random-access transmissions, uplink power control, and the like. In LTE/LTE-A networks, system information is conveyed in a master information block (MIB) and several system information blocks (SIBs). Generally, the MIB, which may be transmitted utilizing a broadcast channel (BCH), includes a limited amount of system information, while the various SIBs, which may be transmitted utilizing a downlink shared channel (DL-SCH), include the bulk of the necessary system information. Such may be the case in the systems 100 and 200 of FIG. 1, FIG. 2A, and FIG. 2B.

LTE/LTE-A defines different SIBs according to the type of system information that each SIB conveys. SIB1 includes cell access information, including cell identity information, and it may indicate whether a UE is allowed to camp on an eNB 105. SIB1 also includes cell selection information (or cell selection parameters). Additionally, SIB1 includes scheduling information for other SIBs. SIB2 includes cell access information and parameters related to common and shared channels, including radio resource configuration information. SIB3 includes cell reselection parameters. SIB4 and SIB5 include reselection information about neighboring LTE cells. SIB6 through SIB8 include reselection information about non-LTE (e.g., UMTS, GERAN, and CDMA2000) neighboring cells. SIB8 includes the name of a Home eNB. SIB10 through SIB12 include emergency notification information (e.g., tsunami and earthquake warnings), which may be of relevant to MTC devices. And SIB13 includes information related to multimedia broadcast/multicast service (MBMS) configuration.

The eNBs 105 of the systems 100 and 200 of FIGS. 1, 2A, and 2B may also be capable of configuring MTC-specific system information blocks, which the MTC devices 115 are configured to receive and process. For instance, an MTC-specific system information block may include a combination of other system information blocks, or a combination of system information included in two or more other system information blocks. In some embodiments, an MTC-specific system information block includes SIB1, SIB2, and/or SIB 12. In some cases, an MTC-specific system information block includes fields for cell access information, scheduling information for other SIB, and radio resource configuration information.

Additionally or alternatively, an MTC-specific system information block may consist of a subset of system information included in one other system information block—this may include system information relevant to an MTC and exclude extraneous system information. For example, an MTC-specific system information block may include a subset of system information available in SIB1, SIB2, or SIB12. For example, an MTC-specific system information block may include fields for cell access information and cell selection, or it may include fields for scheduling information for other system information blocks.

In some cases, the MTC-specific system information blocks includes MTC-specific channel configuration information—e.g., configuration information for an MTC random access channel (RACH) or an MTC paging channel. An MTC-specific system information block may also include configuration information for a physical uplink shared channel (PUSCH), power control, and/or a timer. While in other embodiments, an MTC-specific system information block may include fields for radio resource configuration information other than PUSCH and sounding reference signal (SRS) configuration information.

The different aspects of system 200-*b* may implement different embodiments as discussed above with respect to systems 200-*a* of FIG. 2 and/or system 100 of FIG. 1. Further details regarding different embodiments are also provided below with respect to device 300 of FIG. 3 and/or device 400 of FIG. 4. Some specific embodiments are also provided with respect to systems 500 of FIG. 5, system 600 of FIG. 6, and/or system 700 of FIG. 7, which may be implemented utilizing systems such as system 200-*b* of FIG. 2B.

Figure 3:
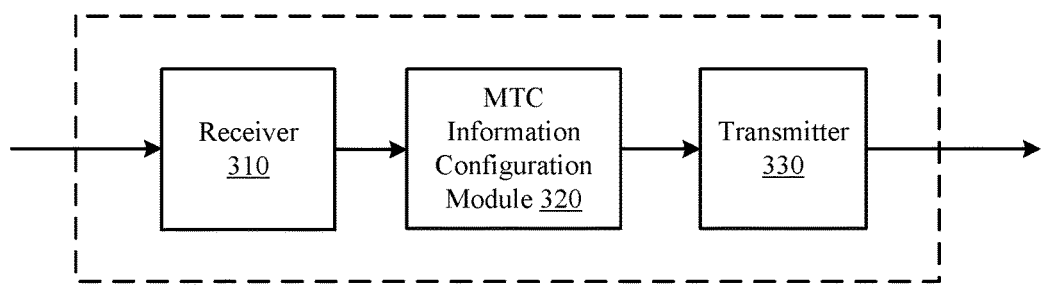
FIG. 3 shows a block diagram of a device configured for facilitating Machine Type Communication in a wireless communications system in accordance with various embodiments.

Turning next to FIG. 3, a block diagram illustrates a device 300 configured for facilitating Machine Type Communication (MTC) in a wireless communications system in accordance with various embodiments. The device 300 may be an example of one or more aspects of the base stations 105 as shown in FIG. 1, FIG. 2A, and/or FIG. 2B. The device 300 may also be a processor. The device 300 may include receiver 310, MTC information configuration module 320, and/or transmitter 330. Each of these components may be in communication with each other. In some cases, these components may be integrated with each other; for example, MTC information configuration module 320 may be integrated transmitter 330.

These components of the device 300 may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors. Each of the noted modules may be a means for performing one or more functions related to operation of the device 300.

MTC information configuration module 320 and/or transmitter 330 may configure information to transmit over an MTC physical broadcast channel. The information may be transmitted over the MTC physical broadcast channel through transmitter 330. In some cases, the information may be transmitted to multiple MTC devices.

In some embodiments, an MTC physical broadcast channel is transmitted within a subframe separate from a regular physical broadcast channel. The MTC physical broadcast channel may be transmitted within a fifth subframe (SF5) of a frame, within the center six resource blocks (RBs). In some cases, the information is transmitted multiple times within a frame.

MTC information configuration module 320 and/or transmitter 330 may configure the information to transmit over the MTC physical broadcast channel to include reducing a payload for the MTC physical broadcast channel with respect to a regular physical broadcast channel. Reducing the payload for the MTC physical broadcast channel may include removing one or more bits utilized to reflect a downlink bandwidth, a system frame number, a physical hybrid ARQ indicator channel (PHICH) duration, a PHICH group, one or more reserved bits, or a cyclic redundancy check with respect to the regular physical broadcast channel.

MTC information configuration module 320 and/or transmitter 330 may be configured to indicate an MTC-specific system information block location over the MTC physical broadcast channel. MTC information configuration module 320 and/or transmitter 330 may be configured to transmit an MTC system frame number over the MTC physical broadcast channel. The MTC system frame number may, for instance, map to a longer frame length than a regular system frame number.

Configuring the information to transmit over the MTC physical broadcast channel through MTC information configuration module 320 and/or transmitter 330 may include configuring a paging indicator to transmit over the MTC physical broadcast channel. The paging indicator may include an individual bit to indicate whether there is paging for at least one MTC device. The paging indicator may include multiple bits to indicate whether there is paging for multiple different paging groups in other cases. Configuring the information to transmit over the MTC physical broadcast channel may include configuring a system information change indicator to transmit over the MTC physical broadcast channel. For example, a counter may be configured and transmitted; and the counter may indicate a system information configuration or a change in the system information configuration. The counter may also notify MTC devices 115 to wake up, receive, and decode one or more MTC-specific system information blocks.

In some embodiments, MTC information configuration module 320 and/or transmitter 330 may configure one or more MTC-specific system information blocks. MTC information configuration module 320 and/or transmitter 330 may transmit the one or more MTC-specific system information blocks to multiple MTC devices.

Configuring the one or more MTC-specific system information blocks through MTC information configuration module 320 and/or transmitter 330 may include combining a portion from each of multiple other system information blocks into at least one of the one or more MTC-specific system information blocks. This may include removing portions from at least one of the multiple regular system information blocks. The MTC information configuration module 320 may also configure MTC-specific system information blocks that include a subset of MTC-relevant, or MTC-specific information available in other system information blocks.

MTC information configuration module 320 and/or transmitter 330 may be configured to utilize one or more MTC fields as part of the one or more MTC-specific system information blocks to replace one or more regular fields from one or more of the multiple system information blocks.

In some cases, the one or more MTC-specific system information blocks are located at one or more predetermined locations. The one or more predetermined locations may be a function of at least a cell ID, a cyclic prefix length, or a division duplex configuration. Some embodiments include utilizing an MTC physical broadcast channel to convey information regarding one or more locations of the MTC-specific system information blocks.

In some embodiments, MTC information configuration module 320 and/or transmitter 330 may determine a system information configuration from multiple system information configurations. A counter may be configured and/or transmitted through MTC information configuration module 320 and/or transmitter 330 to be transmitted over a paging channel to indicate at least the determined system information configuration or a change in the determined system information configuration. The counter may include multiple bits to reflect the determined system information configuration or the change in the determined system information, or both.

Figure 4:
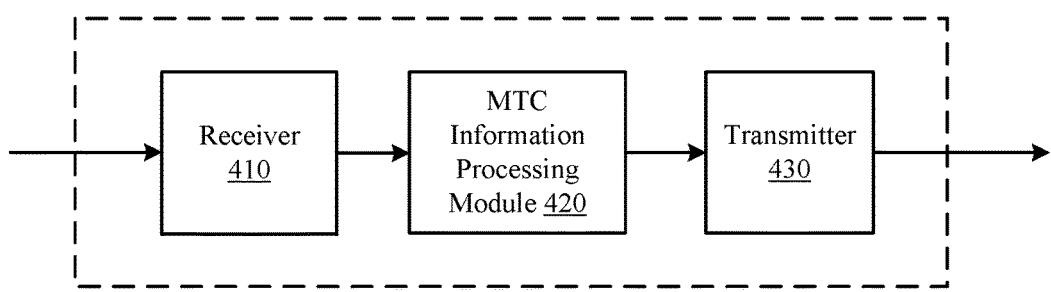
FIG. 4 shows a block diagram of a device configured for facilitating Machine Type Communication in a wireless communications system in accordance with various embodiments.

Turning next to FIG. 4, a block diagram illustrates a device 400 configured for facilitating Machine Type Communication in a wireless communications system in accordance with various embodiments. The device 400 may be an example of one or more aspects of MTC devices 115 described with reference to FIGS. 1, 2A, and/or 2B, for example. The device 400 may also be a processor. The device 400 may include receiver 410, MTC information processing module 420, and/or transmitter 430. Each of these components may be in communication with each other. In some cases, these components may be integrated with each other; for example, MTC information processing module 420 may be integrated with receiver 410.

These components of the device 400 may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors. Each of the noted modules may be a means for performing one or more functions related to operation of the device 400.

In some embodiments, MTC information processing module 420 and/or receiver 410 may be configured to receive information transmitted over an MTC physical broadcast channel. The information received over the MTC physical broadcast channel may be processed by MTC information processing module 420 and/or receiver 410.

In some cases, the information transmitted over the MTC physical broadcast channel is received within a subframe separate from a legacy physical broadcast channel. The information transmitted over the MTC physical broadcast channel may be received within at least a fifth subframe (SF5) of a frame rather than subframe zero (SF0), for example. The information transmitted over the MTC physical broadcast channel may be received within the center six resource blocks (RB) of the subframe. In some cases, the information may be received multiple times within a frame.

The information may include a reduced payload for the MTC physical broadcast channel with respect to a regular physical broadcast channel. The reduced payload for the MTC physical broadcast channel may include a reduced number of one or more bits utilized to reflect a downlink bandwidth, a system frame number, a PHICH duration, a PHICH group, one or more reserved bits, or a cyclic redundancy check.

MTC information processing module 420 and/or receiver 410 may be configured to receive an MTC-specific system information block location over the MTC physical broadcast channel. MTC information processing module 420 and/or receiver 410 may be configured to receive an MTC system frame number over the MTC physical broadcast channel. The MTC system frame number may map to a longer frame length than a regular system frame number.

Receiving the information transmitted over the MTC physical broadcast channel at MTC information processing module 420 and/or receiver 410 may include receiving a paging indicator to transmit over the MTC physical broadcast channel. The paging indicator may include an individual bit to indicate whether there is paging for at least one MTC device in some cases. The paging indicator may include multiple bits to indicate whether there is paging for a plurality of different paging groups. Receiving the information transmitted over the MTC physical broadcast channel may include receiving a system information change indicator transmitted over the MTC physical broadcast channel.

In some embodiments, MTC information processing module 420 and/or receiver 410 are configured to receive one or more MTC-specific system information blocks. The one or more MTC-specific system information blocks may be processed at MTC information processing module 420 and/or receiver 410.

Receiving the one or more MTC-specific system information blocks at MTC information processing module 420 and/or receiver 410 may include receiving an MTC-specific system information block that includes a portion of system information from each of several other system information blocks combined into at least one MTC-specific system information blocks. MTC information processing module 420 and/or receiver 410 may be configured to receive one or more MTC-relevant fields as part of the one or more MTC-specific system information blocks, which may obviate the need to receive and decode one or more fields from other system information blocks.

In some cases, the one or more MTC-specific system information blocks may be located at a predetermined location. The predetermined location may be a function of at least a cell ID, a cyclic prefix length, a division duplex configuration. MTC information processing module 420 and/or receiver 410 may be configured to receive information regarding one or more locations of the one or more MTC-specific system information blocks over an MTC physical broadcast channel.

In some embodiments, MTC information processing module 420 and/or receiver 410 may be configured to receive a counter to indicate a system information configuration or a change in the system information configuration. The counter may include multiple bits to reflect the system information configuration or the change in the system information. The system information configuration or the change in the system information configuration may be determined by MTC information processing module 420 and/or receiver 410 utilizing the counter received over the paging channel.

In some embodiments, MTC information processing module 420 and/or receiver 410 may be configured to determine a sleep time of the MTC device exceeds a time duration. A system information block may be read (e.g., decoded) by MTC information processing module 420 and/or receiver 410 when the determined sleep time exceeds the time duration.

Figure 5:
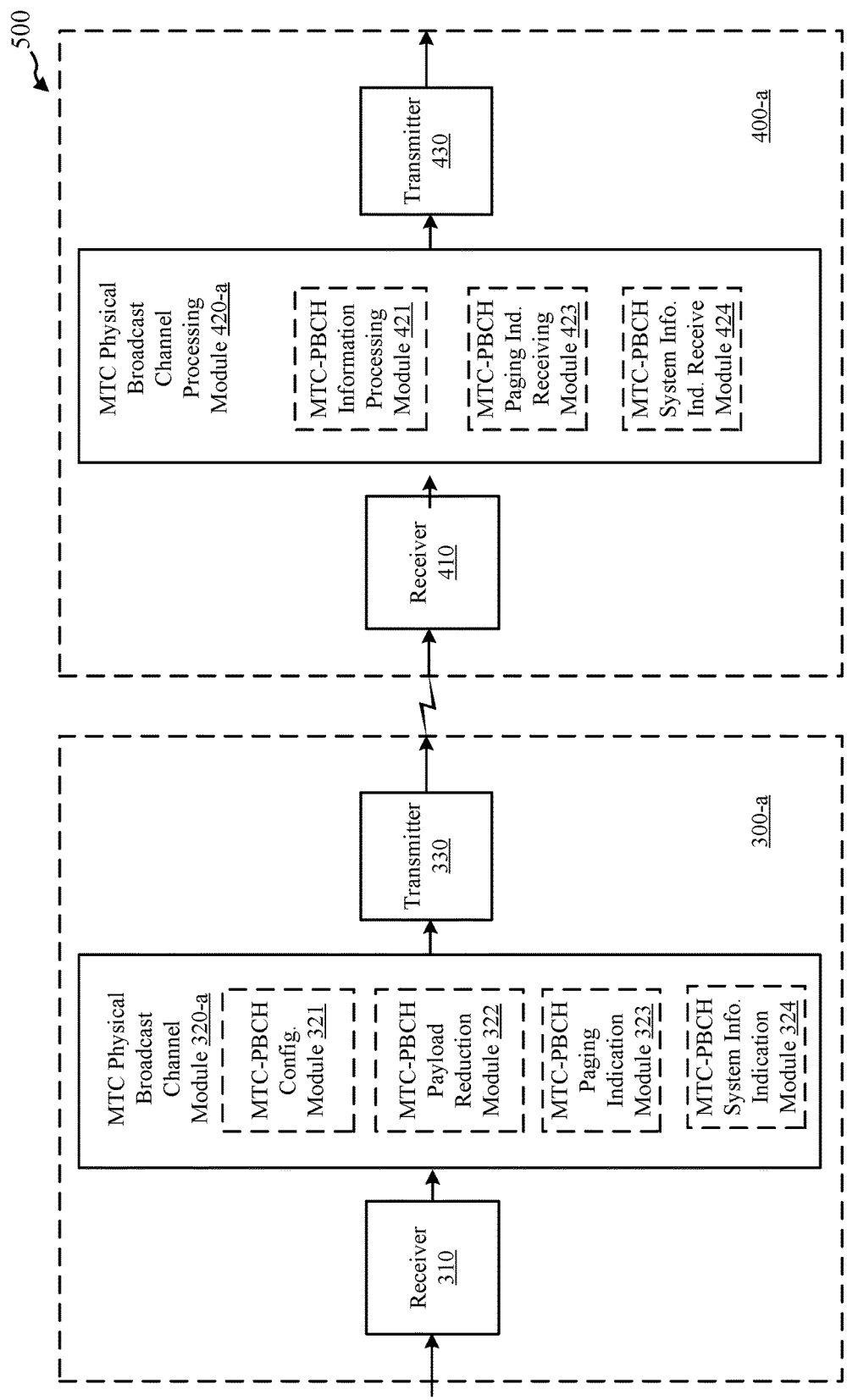
FIG. 5 shows a block diagram of a wireless communications system configured for facilitating Machine Type Communication in accordance with various embodiments.

Turning next to FIG. 5, a block diagram illustrates a system 500 configured for facilitating Machine Type Communication (MTC) in a wireless communications system in accordance with various embodiments. System 500 may include a device 300-*a*, which may be an example of device 300 of FIG. 3, and a device 400-*a*, which may be an example of device 400 of FIG. 4. Devices 300-*a* and/or 400-*a* may also be processors. Device 300-*a* and device 400-*a* may be in wireless communication with each other as part of facilitating the Machine Type Communication.

Device 300-*a* may include receiver 310, MTC physical broadcast channel module 320-*a*, and/or transmitter 330. Each of these components may be in communication with each other. In some cases, these components may be integrated with each other; for example, MTC physical broadcast channel module 320-*a* may be integrated transmitter 330. MTC physical broadcast channel module 320-*a* may include MTC-PBCH configuration module 321, MTC-PBCH payload reduction module 322, MTC-PBCH paging indication module 323, and/or MTC-PBCH system information indication module 324.

Device 400-*a* may include receiver 410, MTC physical broadcast channel processing module 420-*a*, and/or transmitter 430. Each of these components may be in communication with each other. In some cases, these components may be integrated with each other; for example, MTC physical broadcast channel processing module 420-*a* may be integrated receiver 410. MTC physical broadcast channel processing module 420-*a* may include MTC-PBCH information processing module 421, MTC-PBCH paging indication receiving module 423, and/or MTC-PBCH system information indication receiving module 424.

These components of the devices 300-*a* and/or 400-*a* may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors. Each of the noted modules may be a means for performing one or more functions related to operation of the devices 300-*a* and/or 400-*a*.

In some embodiments, MTC physical broadcast channel module 320-*a* through MTC-PBCH configuration module 321 and/or transmitter 330 of device 300-*a* may configure information to transmit over an MTC physical broadcast channel to device 400-*a*. The information may be transmitted over the MTC physical broadcast channel through transmitter 330. In some cases, the information is transmitted to multiple devices, like device 400-*a*. For example, MTC physical broadcast channel processing module 420-*a* through MTC-PBCH information processing module 421 and/or receiver 410 of device 400-*a* may be configured to receive the information transmitted over an MTC physical broadcast channel. The information received over the MTC physical broadcast channel may be processed by MTC physical broadcast channel processing module 420-*a* through MTC-PBCH information processing module 421 and/or receiver 410 of device 400-*a*.

In some embodiments, MTC physical broadcast channel is transmitted within a subframe separate from a regular physical broadcast channel. For example, the MTC physical broadcast channel may be transmitted within the fifth subframe (SF5) of a frame. And it may be transmitted within the center six RBs.

In some cases, the information is transmitted multiple times within a frame. For example, the same MTC physical broadcast channel may be repeated within a 10 ms frame, which may result in better link budget. In some cases, bundled transmission of MTC physical broadcast channels with extended transmission time intervals (TTI) (e.g., multiple subframes/symbols) may be utilized within a 10 ms frame. SF5 may be chosen since a cell-specific reference signal (CRS) may only be present in SF0 and SF5; but other subframes may be chosen as well for the MTC physical broadcast channel. In some cases, the MTC physical broadcast channel location may be a function of a physical cell identification (PCI or cell ID) and/or cyclic prefix (CP) length. In some embodiments, an MTC physical broadcast channel is rate-matched around CRS, assuming a fixed number of transmit antenna ports, for instance, always assumes four transmit antennas. In some embodiments, single transmission for one antenna or space-frequency block coding (SFBC) for two (2) and four (4) antennas is utilized. Some embodiments may result in a reduced number of blind decodes, from three (3) to two (2), for example.

In some embodiments, MTC physical broadcast channel module 320-*a* through MTC-PBCH payload reduction module 322 and/or transmitter 330 of device 300-*a* may configure the information to transmit over the MTC physical broadcast channel to reduce a payload for the MTC physical broadcast channel. For example, the payload of the MTC physical broadcast channel may be reduced as compared with a typical LTE/LTE-A PBCH. Reducing the payload for the MTC physical broadcast channel may include reducing the number of bits utilized to reflect a downlink bandwidth, a system frame number, a PHICH duration, a PHICH group, one or more reserved bits, or a cyclic redundancy check. This reduction in physical broadcast channel payload may be referred to as "removing" aspects of a typical, or "regular" PBCH. MTC physical broadcast channel processing module 420-*a* through MTC-PBCH information processing configuration module 421 and/or receiver 410 of device 400-*a* may be configured to receive the reduced payload transmitted over the MTC physical broadcast channel.

In some embodiments, payload reduction implemented MTC physical broadcast channel module 320-*a* through MTC-PBCH payload reduction module 322 and/or transmitter 330 of device 300-*a* includes removing downlink bandwidth (DL BW) bits, which may generally have three (3) bits. For example, device 300-*a* and/or device 400-*a* may support narrowband operation of 1.4 MHz regardless of system bandwidth for regular services. In some embodiment, device 300-*a* and/or device 400-*a* supports narrowband operation at least in the cell search, in which case bandwidth information may be signaled at a later stage during connection setup.

Payload reduction implemented through MTC-PBCH payload reduction module 322 and/or transmitter 330 of device 300-*a* may include removing PHICH duration bits (which generally includes 1 bit) and PHICH groups bits (which generally includes two (2) bits). Some examples include utilizing a HARQ-less operation. Devices 300-*a* and/or 400-*a* that may utilize a fixed PHICH duration and PHICH group in MTC subframes in some cases.

Payload reduction implemented through MTC-PBCH payload reduction module 322 and/or transmitter 330 of device 300-*a* may include removing or reducing reserved bits from ten (10) bits. In some embodiments, cyclic redundancy check (CRC) bits may be kept the same (typically 16 bits) or reduced to smaller CRC (e.g., 8 bits).

In some embodiments, payload reduction is implemented MTC physical broadcast channel module 320-*a* through MTC-PBCH payload reduction module 322 and/or transmitter 330 of device 300-*a* includes indicating an MTC-specific system information block (SIB) location over the MTC physical broadcast channel. MTC-PBCH payload reduction module 322 and/or transmitter 330 of device 300-*a* may be configured to transmit an MTC system frame number (SFN) over the MTC physical broadcast channel, which may be received and/or processed by receiver 410 and/or MTC-PBCH information processing module 421 of device 400-*a*. The MTC system frame number may map to a longer frame length than a regular system frame number in some cases.

For example, SFNs generally include 8 bits plus 2 bits for blind decode. In some embodiments MTC physical broadcast channel may contain SFN. This may be similar to regular UE operation for determining SIB and/or paging location. In some embodiments, MTC physical broadcast channel may not contain SFN, but it may include one or more bits to indicate the MTC-specific system information block location. For example, 2 bits may be utilized to indicate four (4) possible locations of MTC-specific system information blocks relative to the regular PBCH. In some embodiments, a single bit could be utilized to indicate whether a SIB is present in the current radio frame or MTC radio frame. In some embodiments, a different MTC system frame number may be transmitted, which has larger granularity. SFN generally has 10 ms of frame length; MTC SFN may, for example, have a 40 ms frame length. More repetition for the MTC physical broadcast channel within the MTC SFN may be utilized as a result, and the SFN may be reduced, by 2 bits for instance.

In some embodiments, an MTC physical broadcast channel may be utilized for other purposes. For example, MTC physical broadcast channel module 320-*a* through MTC-PBCH paging indication module 323 and/or transmitter 330 of device 300-*a* may configure information to transmit over the MTC physical broadcast channel that may include a paging indicator. In some cases, the paging indicator includes an individual bit to indicate whether there is paging for at least one MTC device. In other scenarios, the paging indicator may include multiple bits to indicate whether there is paging for multiple different paging groups.

MTC physical broadcast channel processing module 420-*a* through MTC-PBCH paging indication receiving module 423 and/or receiving 410 of device 400-*a* may receive and utilize this paging indication received over the MTC physical broadcast channel. For example, at each wake up, MTC devices 115 through device 400-*a* may only monitor MTC physical broadcast channel. Paging may be indicated through the MTC physical broadcast channel. In one set of embodiments, a single bit may indicate if there is paging for any MTC devices 115. If there is paging, MTC devices 115 through device 400-*a*, in some cases, may try a paging channel. If there is no paging, MTC device 115 may go back to sleep after reading (e.g., decoding) the MTC physical broadcast channel. Some embodiments utilize more than one (1) bit, where multiple MTC devices 115 (or devices 400-*a*) may be split into different paging groups (e.g., four (4) bits for four (4) paging groups).

In some embodiments, MTC physical broadcast channel module 320-*a* through MTC-PBCH system information indication module 324 and/or transmitter 330 of device 300-*a* may configure information to transmit over the MTC physical broadcast channel that may include a system information change indicator. MTC physical broadcast channel processing module 420-*a* through MTC-PBCH system information indication receiving module 424 and/or receiving 410 of device 400-*a* may receive and/or utilize the system indication change indicator. The system information change indicator may utilize a counter. For example, if MTC-PBCH system information indication receiving module 424 and/or receiving 410 of device 400-*a* finds the counter to be the same as the last wake up, this may reflect that there is no system information update. Otherwise, device 400-*a* may decode MTC-specific system information blocks if a connection may be needed.

In some embodiments, MTC physical broadcast channel module 320-*a* through MTC-PBCH system information indication module 324 and/or transmitter 330 of device 300-*a* may configure information to transmit over the MTC physical broadcast channel. For instance, a PDCCH or an ePDCCH configuration indicator may be created and transmitted over the MTC physical broadcast channel. This information may be utilized for SIB scheduling. In some cases, the starting point of ePDCCH depends, for example, on legacy control channel length. In some cases, the configuration may be fixed, which may be at the cost of lost dimensions. In other cases, the configuration may be signaled in PBCH, which may allow better utilization of resources. For example, indicating the PDCCH and/or ePDCCH configuration may include a starting position and/or a frequency location for ePDCCH and/or starting and ending position for narrowband PDCCH. PDCCH may include narrowband PDCCH that may be shifted from the legacy wideband PDCCH region, but time-division multiplexed with data. ePDCCH may include the narrowband ePDCCH that may be frequency-division multiplexed with data.

Figure 6:
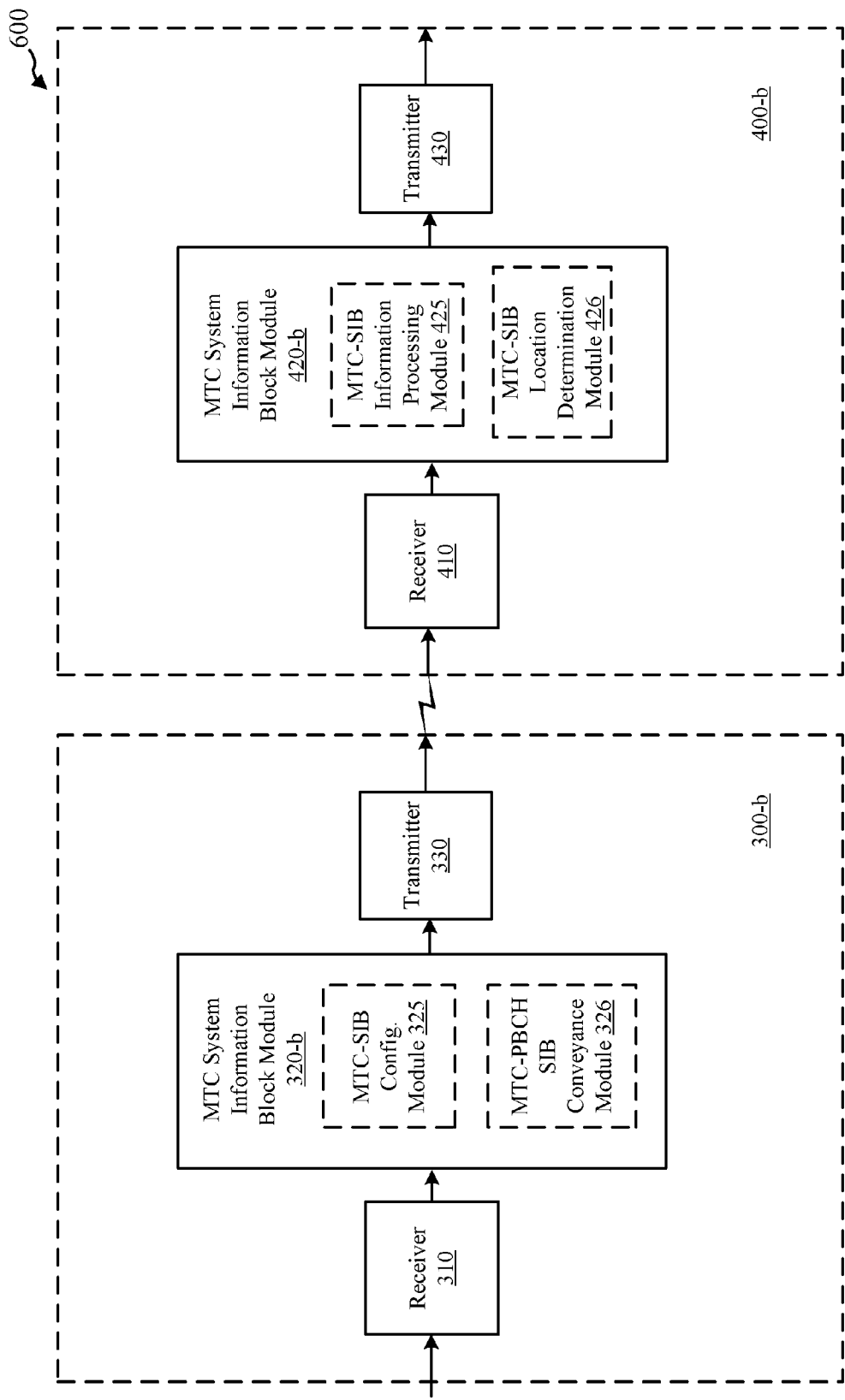
FIG. 6 shows a block diagram of a wireless communications system configured for facilitating Machine Type Communication in accordance with various embodiments.

Turning next to FIG. 6, a block diagram illustrates a system 600 configured for facilitating Machine Type Communication (MTC) in a wireless communications system in accordance with various embodiments. System 600 may include a device 300-*b*, which may be an example of device 300 of FIG. 3, and a device 400-*b*, which may be an example of device 400 of FIG. 4. Devices 300-*b* and/or 400-*b* may also be processors. Device 300-*b* and device 400-*b* may be in wireless communication with each other as part of facilitating the Machine Type Communication.

Device 300-*b* may include receiver 310, MTC system information block module 320-*b*, and/or transmitter 330. Each of these components may be in communication with each other. In some cases, these components may be integrated with each other; for example, MTC system information block module 320-*b* may be integrated transmitter 330. MTC system information block module 320-*b* a may include MTC-SIB configuration module 325 and/or MTC-PBCH SIB conveyance module 326.

Device 400-*b* may include receiver 410, MTC system information block module 420-*b*, and/or transmitter 430. Each of these components may be in communication with each other. In some cases, these components may be integrated with each other; for example, MTC system information block module 420-*b* a may be integrated receiver 410. MTC system information block module 420-*b* may include MTC-SIB information processing module 425 and/or MTC-SIB location determination module 426.

These components of the devices 300-*b* and/or 400-*b* may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors. Each of the noted modules may be a means for performing one or more functions related to operation of the devices 300-*b* and/or 400-*b*.

In some embodiments, MTC system information block module 320-*b* through MTC-SIB configuration module 325 and/or transmitter 330 of device 300-*b* may configure one or more MTC-specific system information blocks. MTC system information block module 320-*b* through MTC-SIB configuration module 325 and/or transmitter 330 may transmit the one or more MTC-specific system information blocks to device 400-*b*. Device 400-*b*, through receiver 410 and/or MTC system information block module 420-*b* through MTC-SIB information processing module 425, may receive and/or process the one or more MTC-specific system information blocks.

Configuring the one or more MTC-specific system information blocks using MTC system information block module 320-*b* through MTC-SIB configuration module 325 and/or transmitter 330 of device 300-*b* may include combining system information (e.g., fields) from several other SIBs into one of the one or more MTC-specific system information blocks. Additionally or alternatively, an MTC-specific system information block may consist of a subset of information available in another system information block. In some embodiments, MTC system information block module 320-*b* through MTC-SIB configuration module 325 and/or transmitter 330 of device 300-*b* may be configured to utilize one or more MTC fields as part of the one or more MTC-specific system information blocks to replace one or more regular fields from one or more other SIBs.

In some embodiments, multiple SIBs may be combined and simplified into one or more MTC-specific system information blocks utilizing MTC system information block module 320-*b* through MTC-SIB configuration module 325 and/or transmitter 330 of device 300-*b*. For example, SIB1 generally includes access information and scheduling information for other SIBs. SIB2 generally includes common and shared channel information. SIB12 generally includes extended access barring (EBA) information for MTC. MTC system information block module 320-*b* through MTC-SIB configuration module 325 and/or transmitter 330 of device 300-*b* may reduce SIB1 to a first MTC-specific system information block through supporting the mandatory list of SIB1, while scheduling information for other SIBs may be reduced to one optional, second MTC-specific system information block for future usage. Some embodiments may reduce SIB2, which may include introducing new fields to replace old fields (e.g., MTC_RACH, MTC_page), while utilizing a simplified design with PUSCH, power control, and/or a timer, and removing some channels, such as PUCCH and/or SRS. In some embodiments, the MTC-specific system information blocks may include the EBA information from SIB12.

In some cases, the one or more MTC-specific system information blocks utilized by devices 300-*b* and/or 400-*b* are located at one or more predetermined locations within an LTE/LTE-A subframe. MTC-specific system information blocks may be configured with predetermined resources blocks (RB) and/or modulation and coding schemes (MCS). In some cases, the subframe location and/or RB may be a function of cell ID. They may also be a function of division duplex configuration, such as Frequency Division Duplex (FDD) versus Time Division Duplex (TDD). The location and/or RB of the MTC-specific system information block may be a function of cyclic prefix (CP) length, such as normal CP (NCP) versus extended CP (ECP). Some embodiments include utilizing an MTC physical broadcast channel to convey information regarding one or more locations of the one or more MTC-specific system information blocks utilizing the MTC-PBCH SIB conveyance module 326 of device 300-*b*. The MTC-SIB location determination module 426 of device 400-*b* may utilize this information to determine the location of the MTC SIBs. For example, the MTC physical broadcast channel may convey SIB1 configuration information, which may include timing and/or RB information for an MTC-specific system information block.

Figure 7:
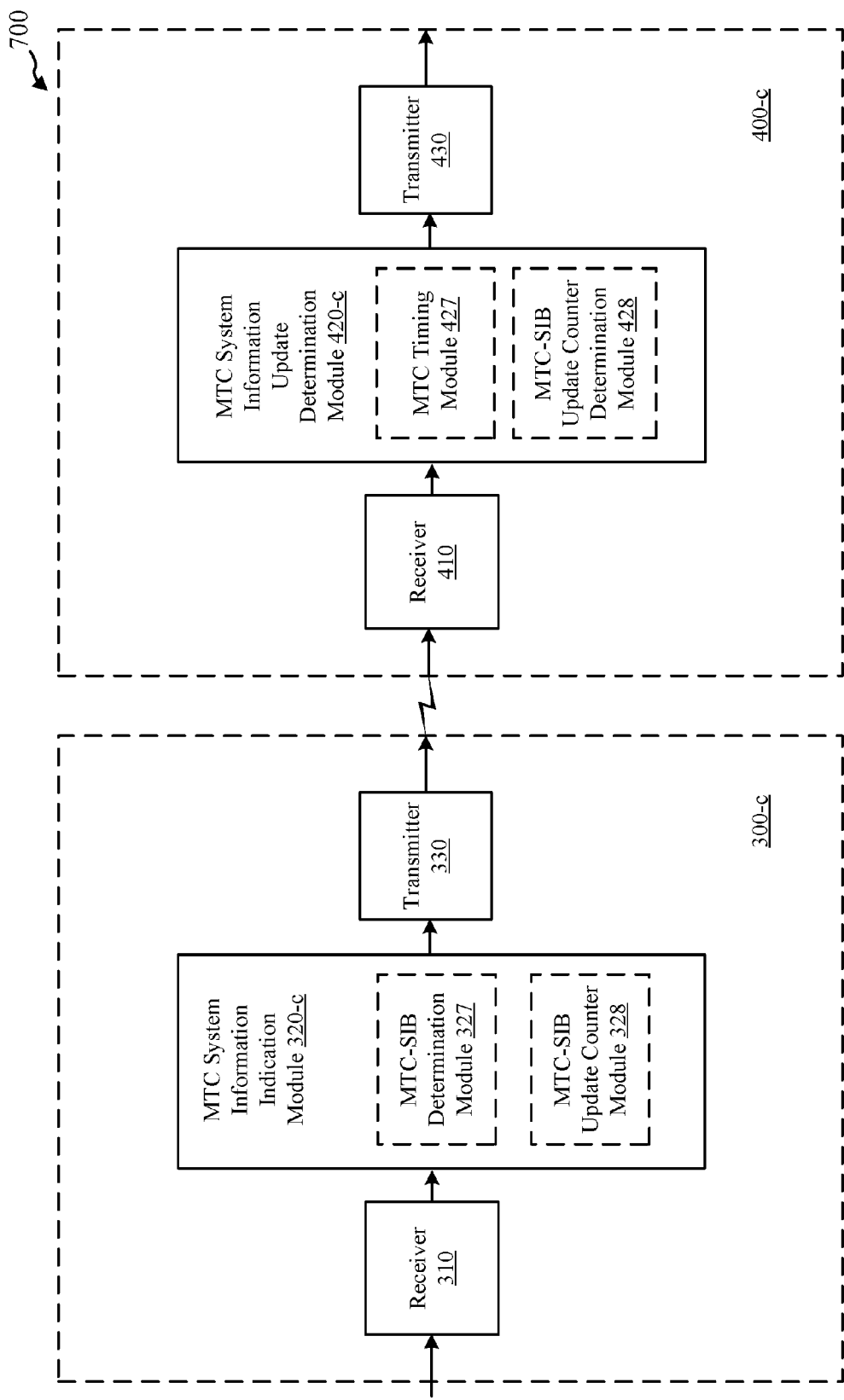
FIG. 7 shows a block diagram of a wireless communications system configured for facilitating Machine Type Communication in accordance with various embodiments.

Turning next to FIG. 7, a block diagram illustrates a system 700 configured for facilitating Machine Type Communication (MTC) in a wireless communications system in accordance with various embodiments. System 700 may include a device 300-*c*, which may be an example of device 300 of FIG. 3, and a device 400-*c*, which may be an example of device 400 of FIG. 4. Devices 300-*c* and/or 400-*c* may also be processors. Device 300-*c* and device 400-*c* may be in wireless communication with each other as part of facilitating the Machine Type Communication.

Device 300-*c* may include receiver 310, MTC system information indication module 320-*c*, and/or transmitter 330. Each of these components may be in communication with each other. In some cases, these components may be integrated with each other; for example, MTC system information indication module 320-*c* may be integrated transmitter 330. MTC system information indication module 320-*c* may include MTC-SIB determination module 327 and/or MTC-SIB update counter module 328.

Device 400-*c* may include receiver 410, MTC system information update determination module 420-*c*, and/or transmitter 430. Each of these components may be in communication with each other. In some cases, these components may be integrated with each other; for example, MTC system information update determination module 420-*c* may be integrated receiver 410. MTC system information update determination module 420-*c* may include MTC timing module 427 and/or MTC-SIB update counter determination module 428.

These components of the devices 300-*c* and/or 400-*c* may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors. Each of the noted modules may be a means for performing one or more functions related to operation of the devices 300-*c* and/or 400-*c*.

In some embodiments, MTC system information indication module 320-*c* through MTC-SIB determination module 327 and/or transmitter module 330 may determine a system information configuration from multiple system information configurations. A counter may be configured and/or transmitted through MTC-SIB update counter module 328 and/or transmitter 330 to indicate the system information configuration or a change in the system information configuration. The counter may include one or more bits to reflect the system information configuration or the change in the determined system information. MTC system information update determination module 420-*c* through MTC-SIB update counter determination module 428 and/or receiver module 410 of device 400-*c* may be configured to receive the counter to indicate the system information configuration or a change in the system information configuration. The system information configuration or a change in the system information configuration may be determined by MTC-SIB update counter determination module 428 and/or receiver module 410 of device 400-*c* utilizing the counter received over the paging channel.

For example, a counter may be added to a page to indicate the system information update utilizing multiple bits. Device 400-*c* may wake up infrequently to receive and read the counter. If the received counter is different from the previous wake up, device 400-*c* may determine that the system information has changed. For instance, the counter could be incremented (e.g., incremented by a count of one (1)) whenever the system information changes. The device 400-*c* may thus be configured to determine system information has changed since a previous wake-up if it receives an incremented counter. In some cases, the counter may indicate both a change in system information configuration and an updated system information configuration. For example, the counter may include four (4) bits to map to sixteen (16) different system information configurations, which the device 400-*c* may be configured to identify.

In various embodiments, the device 300-*c* may convey, and the device 400-*c* may receive, a counter over different channels. For example, the counter may be conveyed and received over a paging channel, over PBCH, or over an MTC physical broadcast channel. The counter may also be included in, and decoded from, a SIB, such as an MTC-specific SIB.

In some embodiments, MTC system information update determination module 420-c through MTC timing module 427 and/or receiver module 410 of device 400-c may be configured to determine a sleep time of the MTC device exceeds a time duration. A system information block may be read by MTC system information update determination module 420-c and/or receiver 410 when the determined sleep time exceeds the time duration. For example, if device 400-c has a sleep time that exceeds a specific time duration, it may assume that the system information has changed, and it may read a SIB (e.g., an MTC-specific SIB) upon making such a determination. In some cases, the device 400-c is programmed with a sleep time duration, which may be on the order of seconds, minutes, or longer.

Figure 8:
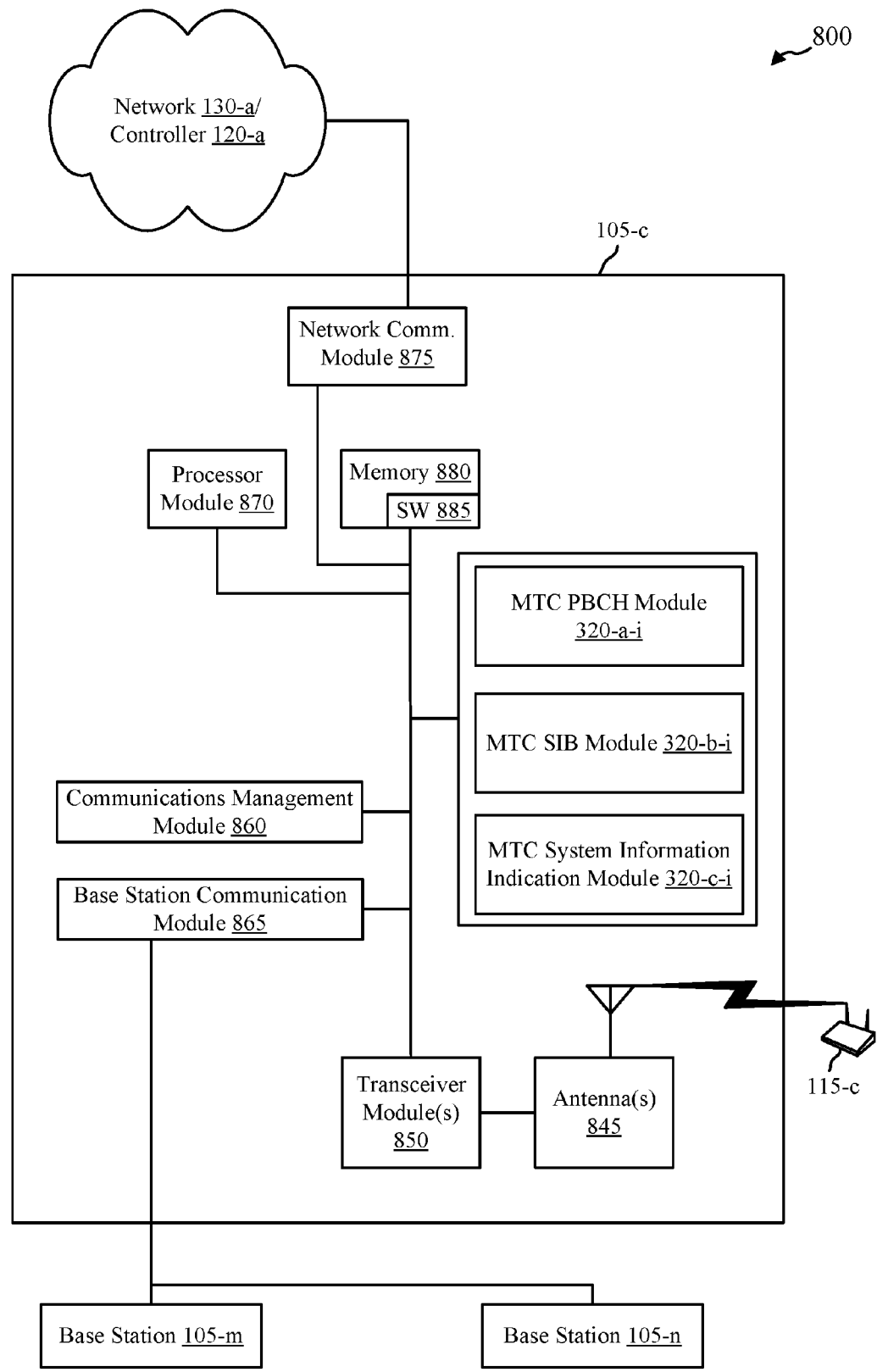
FIG. 8 shows a block diagram of a communications system configured for facilitate Machine Type Communication in accordance with various embodiments.

FIG. 8 shows a block diagram of a communications system 800 configured to facilitate Machine Type Communication with MTC device(s) 115-c in accordance with various embodiments. This system 800 may be an example of aspects of the system 100 depicted in FIG. 1 and/or system 200 of FIGS. 2A and 2B. System 800 may include a base station 105-c. The base station 105-c may include antenna(s) 845, a transceiver module 850, a processor module 870, and memory 880, which each may be in communication, directly or indirectly, with each other (e.g., over one or more buses). The transceiver module 850 may be configured to communicate bi-directionally, via the antenna(s) 845, with the MTC device 115-c, which may be a multi-mode MTC device. The transceiver module 850 (and/or other components of the base station 105-c) may also be configured to communicate bi-directionally with one or more networks. In some cases, the base station 105-c may communicate with the core network 130-a and/or controller 120-a through network communications module 875. Base station 105-c may be an example of an eNodeB base station, a Home eNodeB base station, a NodeB base station, and/or a Home NodeB base station. Controller 120-a may be integrated into base station 105-c in some cases, such as with an eNodeB base station.

Base station 105-c may also communicate with other base stations 105, such as base station 105-m and base station 105-n. Each of the base stations 105 may communicate with MTC device 115-c using different wireless communications technologies, such as different Radio Access Technologies. In some cases, base station 105-c may communicate with other base stations such as 105-m and/or 105-n utilizing base station communication module 865. In some embodiments, base station communication module 865 may provide an X2 interface within an LTE/LTE-A wireless communication technology to provide communication between some of the base stations 105. In some embodiments, base station 105-c may communicate with other base stations through controller 120-a and/or core network 130-a.

The memory 880 may include random access memory (RAM) and read-only memory (ROM). The memory 880 may also store computer-readable, computer-executable software code 885 containing instructions that are configured to, when executed, cause the processor module 870 to perform various functions described herein (e.g., processing of communications from MTC device 115-c, message routing, etc.). Alternatively, the software code 885 may not be directly executable by the processor module 870 but may be configured to cause the computer, e.g., when compiled and executed, to perform functions described herein.

The processor module 870 may include an intelligent hardware device, e.g., a central processing unit (CPU) such as those made by Intel® Corporation or AMD®, a microcontroller, an application-specific integrated circuit (ASIC), etc. The transceiver module 850 may include a modem configured to modulate the packets and provide the modulated packets to the antenna(s) 845 for transmission, and to demodulate packets received from the antenna(s) 845. While some examples of the base station 105-c may include a single antenna 845, the base station 105-c may include multiple antennas 845 for multiple links which may support carrier aggregation. For example, one or more links may be used to support macro communications with MTC device 115-c.

According to the architecture of FIG. 8, the base station 105-c may further include a communications management module 860. The communications management module 860 may manage communications with other base stations 105. By way of example, the communications management module 860 may be a component of the base station 105-c in communication with some or all of the other components of the base station 105-c via a bus. Alternatively, functionality of the communications management module 860 may be implemented as a component of the transceiver module 850, as a computer program product, and/or as one or more controller elements of the processor module 870.

The base station 105-c may be configured to implement aspects discussed above with facilitating Machine Type Communication with respect to devices 300 of FIGS. 3, 5, 6, and/or 7 and may not e repeated here for the sake of brevity. For example, base station 105-c may include an MTC PBCH module 320-a-i, which may be an example of the MTC information configuration module 320 of FIG. 3 and/or the MTC physical broadcast channel module 320-a of FIG. 5. The base station 105-c may include an MTC SIB module 320-b-i, which may be an example of the MTC information configuration module 320 of FIG. 3 and/or the MTC system information block module 320-b of FIG. 6. The base station 105-c may include an MTC system information indication module 320-c-i, which may be an example of MTC information configuration module 320 of FIG. 3 and/or the MTC system information indication module 320-c of FIG. 7.

Components of base station 105-c may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors. Each of the noted modules may be a means for performing one or more functions related to operation of the base station 105-c.

Figure 9:
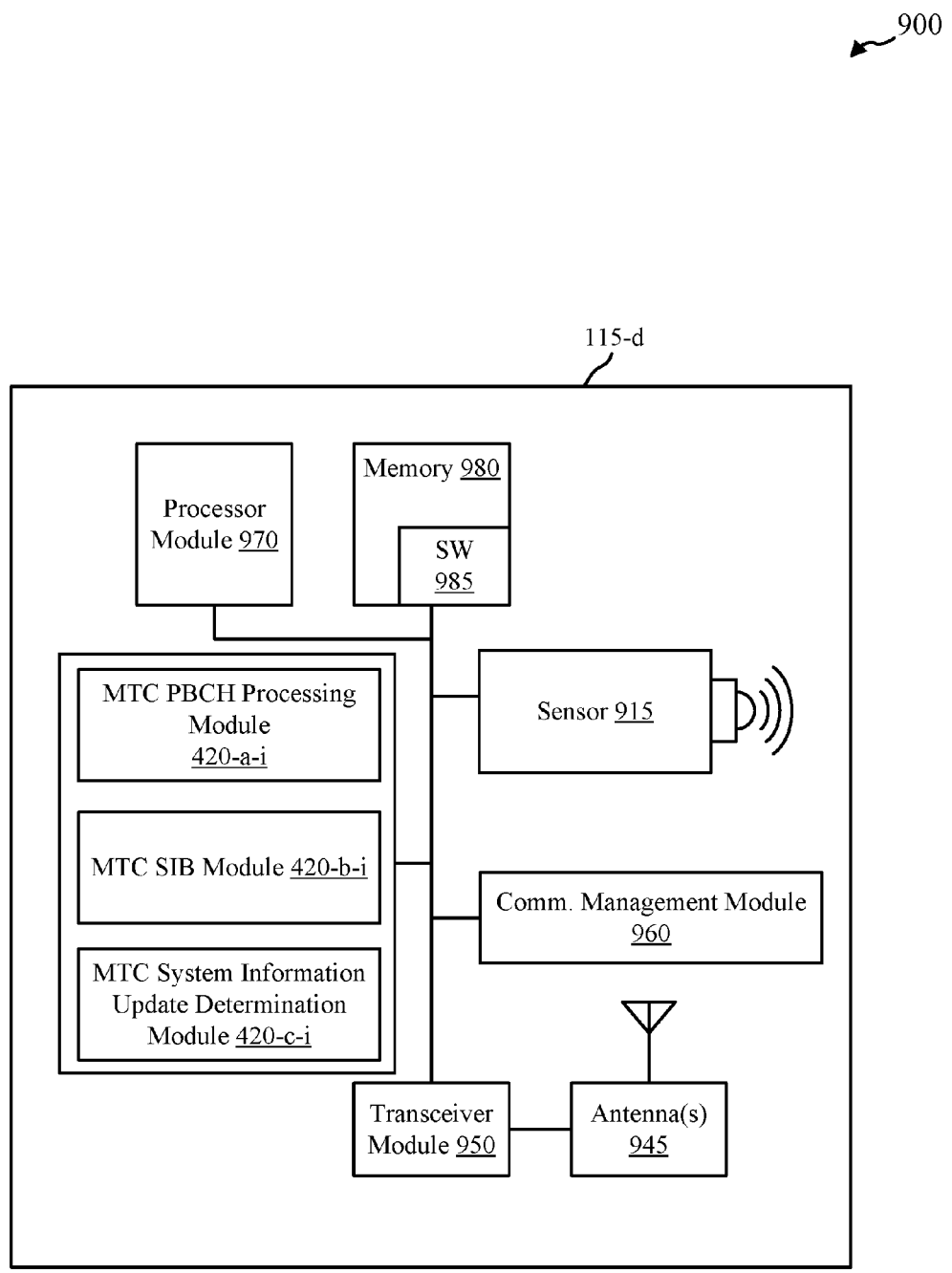
FIG. 9 shows a block diagram of an MTC device configured for facilitating Machine Type Communication in accordance with various embodiments.

FIG. 9 is a block diagram 900 of an MTC device 115-d configured for facilitating Machine Type Communication in accordance with various embodiments. The MTC device 115-d may have any of various configurations and be coupled with one or more other devices, as discussed above, to sense one or more conditions related to a monitor, meter, and/or other device associated with the MTC device 115-d. The MTC device 115-d may have an internal power supply (not shown), such as a small battery, to facilitate mobile operation. In some embodiments, the MTC device 115-d may be an MTC device 115 of FIG. 1, FIG. 2A, FIG. 2B, FIG. 8, and/or FIG. 10. The MTC device 115-*d* may be referred to as an MTC UE or M2M device, in some cases.

The MTC device 115-*d* may include a sensor 915 in some embodiments. MTC device 115-*d* also includes antenna(s) 945, a transceiver module 950, a processor module 970 and memory 980, which each may be in communication, directly or indirectly, with each other (e.g., via one or more buses). The transceiver module 950 may be configured to communicate bi-directionally, via the antenna(s) 945 and/or one or more wired or wireless links, with one or more networks, as described above. For example, the transceiver module 950 may be configured to communicate bi-directionally with base stations 105 of FIG. 1, FIG. 2A, FIG. 2B, FIG. 8, and/or FIG. 10. The transceiver module 950 may include a modem configured to modulate the packets and provide the modulated packets to the antenna(s) 945 for transmission, and to demodulate packets received from the antenna(s) 945. While the MTC device 115-*d* may include a single antenna 945, the MTC device 115-*d* may include multiple antennas 945 for multiple transmission links.

The memory 980 may include random access memory (RAM) and read-only memory (ROM). The memory 980 may store computer-readable, computer-executable software code 985 containing instructions that are configured to, when executed, cause the processor module 970 to perform various functions described herein (e.g., process MTC-specific system information blocks, determine sleep times, determine system information configurations or changes in system information configurations, etc.). Alternatively, the software code 985 may not be directly executable by the processor module 970 but may be configured to cause the computer (e.g., when compiled and executed) to perform functions described herein.

The processor module 970 may include an intelligent hardware device, e.g., a central processing unit (CPU) such as those made by Intel® Corporation or AMD®, a microcontroller, an application-specific integrated circuit (ASIC), etc. According to the architecture of FIG. 9, the mobile device 115-*d* may further include a communications management module 960. The communications management module 960 may manage communications with base stations 105 and/or other MTC devices 115. By way of example, the communications management module 960 may be a component of the MTC device 115-*d* in communication with some or all of the other components of the mobile device 115-*d* via a bus. Alternatively, functionality of the communications management module 960 may be implemented as a component of the transceiver module 950, as a computer program product, and/or as one or more controller elements of the processor module 970.

The MTC device 115-*d* may be configured to facilitate Machine Type Communication as discussed with respect to devices 400 of FIGS. 4, 5, 6, and/or 7 and may not be repeated here for the sake of brevity. For example, the MTC device 115-*d* may include an MTC PBCH processing module 420-*a-i*, which may be an example of the MTC information processing module 420 of FIG. 4 and/or the MTC physical broadcast channel processing module 420-*a* of FIG. 5. The MTC device 115-*d* may include an MTC SIB module 420-*b-i*, which may be an example of the MTC information processing module 420 of FIG. 4 and/or the MTC system information block module 420-*b* of FIG. 6. The MTC device 115-*d* may include an MTC system information update determination module 420-*c-i*, which may be an example of MTC information processing module 420 of FIG. 4 and/or the MTC system information update determination module 420-*c* of FIG. 7.

Components of MTC device 115-*d* may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors. Each of the noted modules may be a means for performing one or more functions related to operation of the MTC device 115-*d*.

Figure 10:
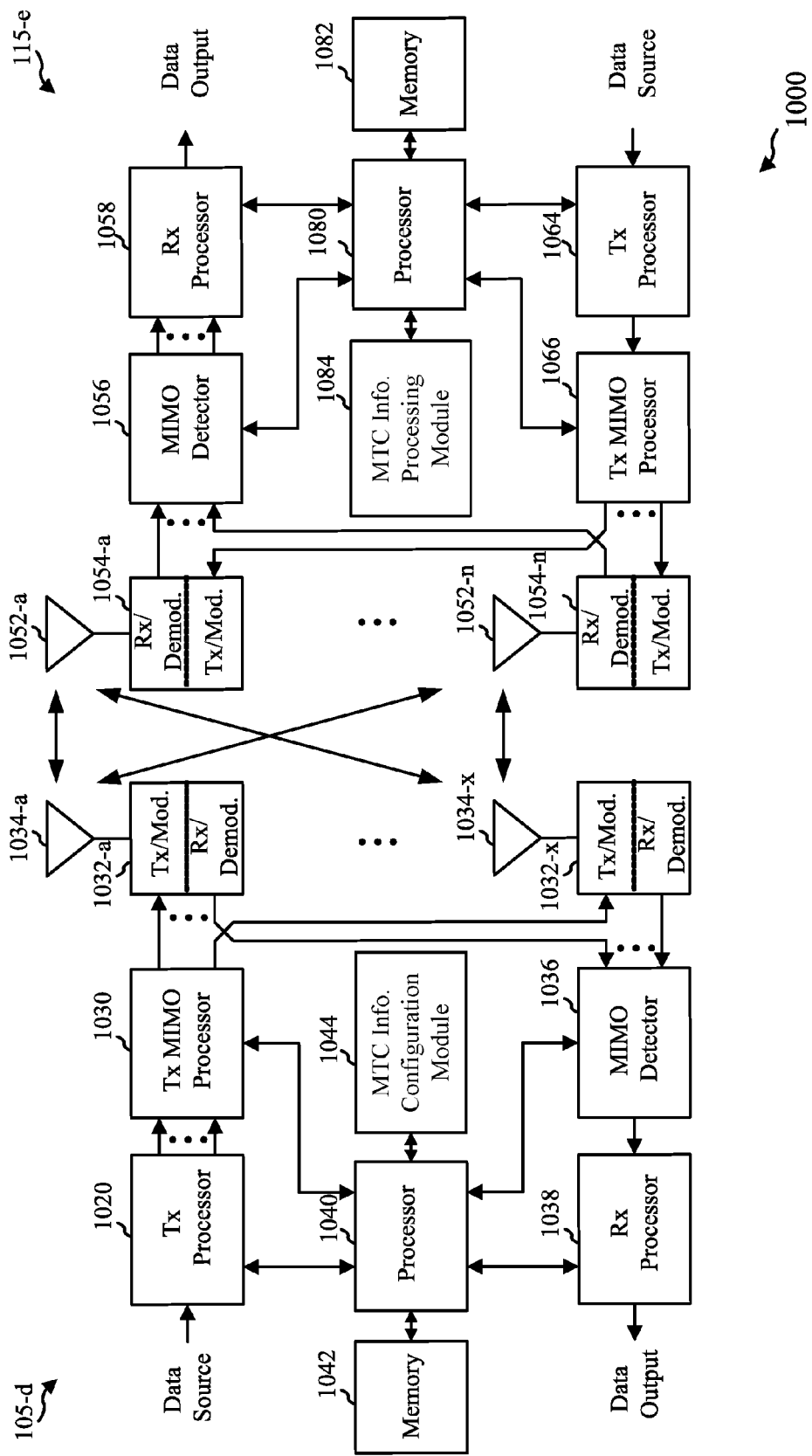
FIG. 10 is a block diagram of a system including a base station and an MTC device in accordance with various embodiments.

FIG. 10 is a block diagram of a system 1000 including a base station 105-*d* and a mobile device 115-*e* in accordance with various embodiments. This system 1000 may be an example of the system 100 of FIG. 1, system 200-*a* of FIG. 2A, system 200-*b* of FIG. 2B, system 500 of FIG. 5, system 600 of FIG. 6, system 700 of FIG. 7, and/or system 800 of FIG. 8. The base station 105-*d* may be equipped with antennas 1034-*a* through 1034-*x*, and the mobile device 115-*e* may be equipped with antennas 1052-*a* through 1052-*n*. At the base station 105-*f*, a transmit processor 1020 may receive data from a data source.

The transmitter processor 1020 may process the data. The transmitter processor 1020 may also generate reference symbols, and a CRS. A transmit (TX) MIMO processor 1030 may perform spatial processing (e.g., precoding) on data symbols, control symbols, and/or reference symbols, if applicable, and may provide output symbol streams to the transmit modulators 1032-*a* through 1032-*x*. Each modulator 1032 may process a respective output symbol stream (e.g., for OFDM, etc.) to obtain an output sample stream. Each modulator 1032 may further process (e.g., convert to analog, amplify, filter, and upconvert) the output sample stream to obtain a downlink (DL) signal. In one example, DL signals from modulators 1032-*a* through 1032-*x* may be transmitted via the antennas 1034-*a* through 1034-*x*, respectively. The transmitter processor 1020 may receive information from a processor 1040. In some embodiments, the processor 1040 may be implemented as part of a general processor, the transmitter processor 1020, and/or the receiver processor 1038. A memory 1042 may be coupled with the processor 1040.

In some embodiments, the processor 1040 and/or MTC information configuration module 1044 are configured to communicate with MTC device 115-*e*. The processor 1040 and/or MTC information configuration module 1044 may configure information to transmit over an MTC physical broadcast channel. The information may be transmitted over the MTC physical broadcast channel through transmitters 1032. In some cases, the information may be transmitted to multiple MTC devices.

In some embodiments, MTC physical broadcast channel is transmitted within a subframe separate from a regular physical broadcast channel. The MTC physical broadcast channel may be transmitted within a fifth subframe (SF5) of a frame, and within the center six (6) RBs. In some cases, the information is transmitted multiple times within a frame.

The processor 1040 and/or MTC information configuration module 1044 may configure the information to transmit over the MTC physical broadcast channel to include reducing a payload for the MTC physical broadcast channel with respect to a regular physical broadcast channel. Reducing the payload for the MTC physical broadcast channel may include removing one or more bits utilized to reflect a downlink bandwidth, a system frame number, a physical hybrid ARQ indicator channel (PHICH) duration, a PHICH group, one or more reserved bits, or a cyclic redundancy check with respect to the regular physical broadcast channel.

The processor 1040 and/or MTC information configuration module 1044 may be configured to indicate an MTC-specific system information block location over the MTC physical broadcast channel. The processor 1040 and/or MTC information configuration module 1044 may be configured to transmit an MTC system frame number over the MTC physical broadcast channel. The MTC system frame number may map to a longer frame length than a regular system frame number.

Configuring the information to transmit over the MTC physical broadcast channel through the processor 1040 and/or MTC information configuration module 1044 may include configuring a paging indicator to transmit over the MTC physical broadcast channel. The paging indicator may include an individual bit to indicate whether there is paging for at least one MTC device in some cases. The paging indicator may include multiple bits to indicate whether there is paging for multiple different paging groups in other cases. Configuring the information to transmit over the MTC physical broadcast channel may include configuring a system information change indicator, such as a counter, to transmit over the MTC physical broadcast channel.

In some embodiments, the processor 1040 and/or MTC information configuration module 1044 may configure one or more MTC-specific system information blocks. The transmitters 1032 may transmit the one or more MTC-specific system information blocks to multiple MTC devices.

Configuring the one or more MTC system information blocks through the processor 1040 and/or MTC information configuration module 1044 may include combining a portion from each of multiple other system information blocks into at least one of the one or more MTC system information blocks. Combining the portion from each of the multiple regular system information blocks into MTC-specific system information blocks may include removing another portion from one of the other system information blocks. Or it may involve selecting a subset of system information from another system information block.

The processor 1040 and/or MTC information configuration module 1044 may be configure to utilize one or more MTC fields as part of the MTC-specific system information blocks to replace fields from other system information blocks.

In some cases, MTC-specific system information blocks are located at one or more predetermined locations. The predetermined locations may be a function of a cell ID, a cyclic prefix length, or a division duplex configuration. Some embodiments include utilizing an MTC physical broadcast channel to convey information regarding one or more locations of the one or more MTC system information blocks.

In some embodiments, the processor 1040 and/or MTC information configuration module 1044 may determine a system information configuration from multiple system information configurations. A counter may be configured and/or transmitted through the processor 1040 and/or MTC information configuration module 1044 to be transmitted to indicate the system information configuration or a change in the system information configuration. The counter may include multiple bits to reflect determined system information configuration or the change in the determined system information.

At the MTC device 115-*e*, the mobile device antennas 1052-*a* through 1052-*n* may receive the DL signals from the base station 105-*d* and may provide the received signals to the demodulators 1054-*a* through 1054-*n*, respectively. Each demodulator 1054 may condition (e.g., filter, amplify, downconvert, and digitize) a respective received signal to obtain input samples. Each demodulator 1054 may further process the input samples (e.g., for OFDM, etc.) to obtain received symbols. A MIMO detector 1056 may obtain received symbols from all the demodulators 1054-*a* through 1054-*n*, perform MIMO detection on the received symbols if applicable, and provide detected symbols. A receiver processor 1058 may process (e.g., demodulate, deinterleave, and decode) the detected symbols, providing decoded data for the MTC device 115-*e* to a data output, and provide decoded control information to a processor 1080, or memory 1082.

On the uplink (UL), at the MTC device 115-*e*, a transmitter processor 1064 may receive and process data from a data source. The transmitter processor 1064 may also generate reference symbols for a reference signal. The symbols from the transmitter processor 1064 may be precoded by a transmit MIMO processor 1066 if applicable, further processed by the demodulators 1054-*a* through 1054-*n* (e.g., for SC-FDMA, etc.), and be transmitted to the base station 105-*d* in accordance with the transmission parameters received from the base station 105-*f*. The transmitter processor 1064 may be configured to obtain information from a sensor, meter, or other device associated with the MTC device 115-*e* and package the information for transmission in accordance with the embodiments described above. At the base station 105-*d*, the UL signals from the MTC device 115-*e* may be received by the antennas 1034, processed by the demodulators 1032, detected by a MIMO detector 1036 if applicable, and further processed by a receive processor. The receive processor 1038 may provide decoded data to a data output and to the processor 1080. In some embodiments, the processor 1080 may be implemented as part of a general processor, the transmitter processor 1064, and/or the receiver processor 1058.

In some embodiments, the processor 1080 and/or the MTC information processing module 1084 may be configured to receive information transmitted over an MTC physical broadcast channel. The information received over the MTC physical broadcast channel may be processed by the processor 1080 and/or the MTC information processing module 1084

In some cases, the information transmitted over the MTC physical broadcast channel is received within a subframe separate from a regular physical broadcast channel. The information transmitted over the MTC physical broadcast channel may be received within the fifth subframe (SF5) of a frame, for example. The information transmitted over the MTC physical broadcast channel may be received within the center six (6) RBs of the subframe. In some cases, the information may be received multiple times within a frame.

The information may include a reduced payload for the MTC physical broadcast channel with respect to a regular physical broadcast channel. The reduced payload for the MTC physical broadcast channel may include a reduced number of one or more bits utilized to reflect a downlink bandwidth, a system frame number, a physical hybrid ARQ indicator channel (PHICH) duration, a PHICH group, one or more reserved bits, or a cyclic redundancy check with respect to the regular physical broadcast channel.

The processor 1080 and/or the MTC information processing module 1084 may be configured to receive an MTC system information block location over the MTC physical broadcast channel. MTC information processing module 1084 and/or receiver processor 1058 may be configured to receive an MTC system frame number over the MTC physical broadcast channel. The MTC system frame number may map to a longer frame length than a regular system frame number.

Receiving the information transmitted over the MTC physical broadcast channel at the processor 1080 and/or the MTC information processing module 1084 may include receiving an indicator transmitted over the MTC physical broadcast channel. The indicator may include an individual bit to indicate whether there is paging for the MTC device 115-*e*. The paging indicator may include multiple bits to indicate whether there is paging for a plurality of different paging groups. Receiving the information transmitted over the MTC physical broadcast channel may include receiving a system information change indicator, such as a counter, transmitted over the MTC physical broadcast channel.

In some embodiments, the processor 1080 and/or the MTC information processing module 1084 may be configured to receive one or more MTC system information blocks. The one or more MTC system information blocks may be processed at the processor 1080 and/or the MTC information processing module 1084

Receiving the one or more MTC-specific system information blocks at the processor 1080 and/or the MTC information processing module 1084 may include receiving a portion from each of several other system information blocks combined into one or more MTC-specific system information blocks. The MTC-specific system information blocks may include MTC-relevant system information, and they may exclude additional system information. The processor 1080 and/or the MTC information processing module 1084 may be configured to receive one or more MTC fields as part of the one or more MTC system information blocks to replace one or more fields from one or more of the plurality of regular system information blocks.

In some cases, the MTC-specific system information blocks may be located at predetermined locations. The predetermined locations may be a function of a cell ID, a cyclic prefix length, a division duplex configuration. The processor 1080 and/or the MTC information processing module 1084 may be configured to receive information regarding one or more locations of the one or more MTC system information blocks over an MTC physical broadcast channel.

In some embodiments, the processor 1080 and/or the MTC information processing module 1084 may be configured to receive a counter over to indicate the system information configuration or a change in the system information configuration. The counter may include multiple bits to reflect the system information configuration or the change in the determined system information. The system information configuration or a change in the system information configuration may be determined by the processor 1080 and/or the MTC information processing module 1084 utilizing the counter received over the paging channel.

In some embodiments, the processor 1080 and/or the MTC information processing module 1084 may be configured to determine a sleep time of the MTC device 115-*e* exceeds a time duration. A system information block may be read by the processor 1080 and/or the MTC information processing module 1084 when the determined sleep time exceeds the time duration.

Figure 11A:
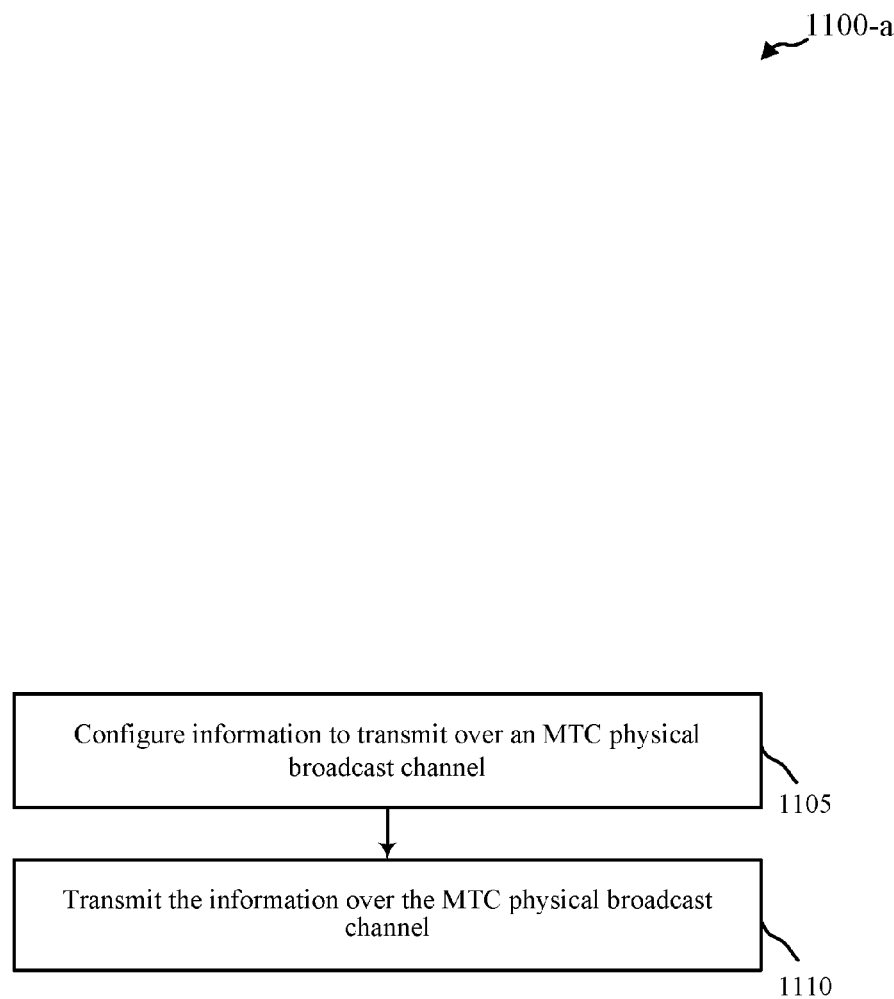
FIG. 11A is a flow chart illustrating an example of a method for facilitating Machine Type Communication in a wireless communications system in accordance with various embodiments.

FIG. 11A is a flow chart illustrating an example of a method 1100-*a* for facilitating Machine Type Communication (MTC) in a wireless communications system. For clarity, the method 1100-*a* is described below with reference to devices such as: the base stations 105 of FIG. 1, FIG. 2A, FIG. 2B, FIG. 8, and/or FIG. 10; and/or devices 300 of FIG. 3, FIG. 5, FIG. 6, and/or FIG. 7. In one implementation, a processor may execute one or more sets of codes to control the functional elements of the wireless device to perform the functions described below.

At block 1105, information may be configured to transmit over an MTC physical broadcast channel. The operations of block 1105 may be performed by the MTC information configuration module 320 of FIG. 3, the MTC physical broadcast channel module 320-*a* of FIG. 5, and/or the MTC-PBCH configuration module 321 of FIG. 5. Configuring the information to transmit over the MTC physical broadcast channel may include reducing a payload for the MTC physical broadcast channel with respect to a regular physical broadcast channel. Reducing the payload for the MTC physical broadcast channel may include removing, with respect to the regular physical broadcast channel, one or more bits utilized to reflect a downlink bandwidth, a system frame number, a physical hybrid ARQ indicator channel (PHICH) duration, a PHICH group, one or more reserved bits, or a cyclic redundancy check.

In some cases, configuring the information to transmit over the MTC physical broadcast channel may include configuring a paging indicator to transmit over the MTC physical broadcast channel. The paging indicator may include an individual bit to indicate whether there is paging for at least one MTC device in some cases. The paging indicator may include multiple bits to indicate whether there is paging for multiple different paging groups in other cases. Configuring the information to transmit over the MTC physical broadcast channel at block 1105 may include configuring a system information change indicator to transmit over the MTC physical broadcast channel. Configuring the information to transmit over the MTC physical broadcast channel may include configuring at least a PDCCH or an ePDCCH configuration indicator to transmit over the MTC physical broadcast channel.

At block 1110, the information may be transmitted over the MTC physical broadcast channel. In some cases, the information may be transmitted to multiple MTC devices. The operations of block 1110 are, in various embodiments, performed by the transmitter 330 of FIG. 3 or 5. In some embodiments, the MTC physical broadcast channel is transmitted within a subframe separate from a regular physical broadcast channel. The MTC physical broadcast channel may be transmitted within the fifth subframe (SF5) of a frame and/or within the center six (6) RBs. In some cases, the information is transmitted multiple times within a frame.

Some embodiments of method 1100-*a* include indicating an MTC system information block location over the MTC physical broadcast channel. Some embodiments include transmitting an MTC system frame number over the MTC physical broadcast channel, where the MTC system frame number maps to a longer frame length than a regular (e.g., legacy) system frame number.

Figure 11B:
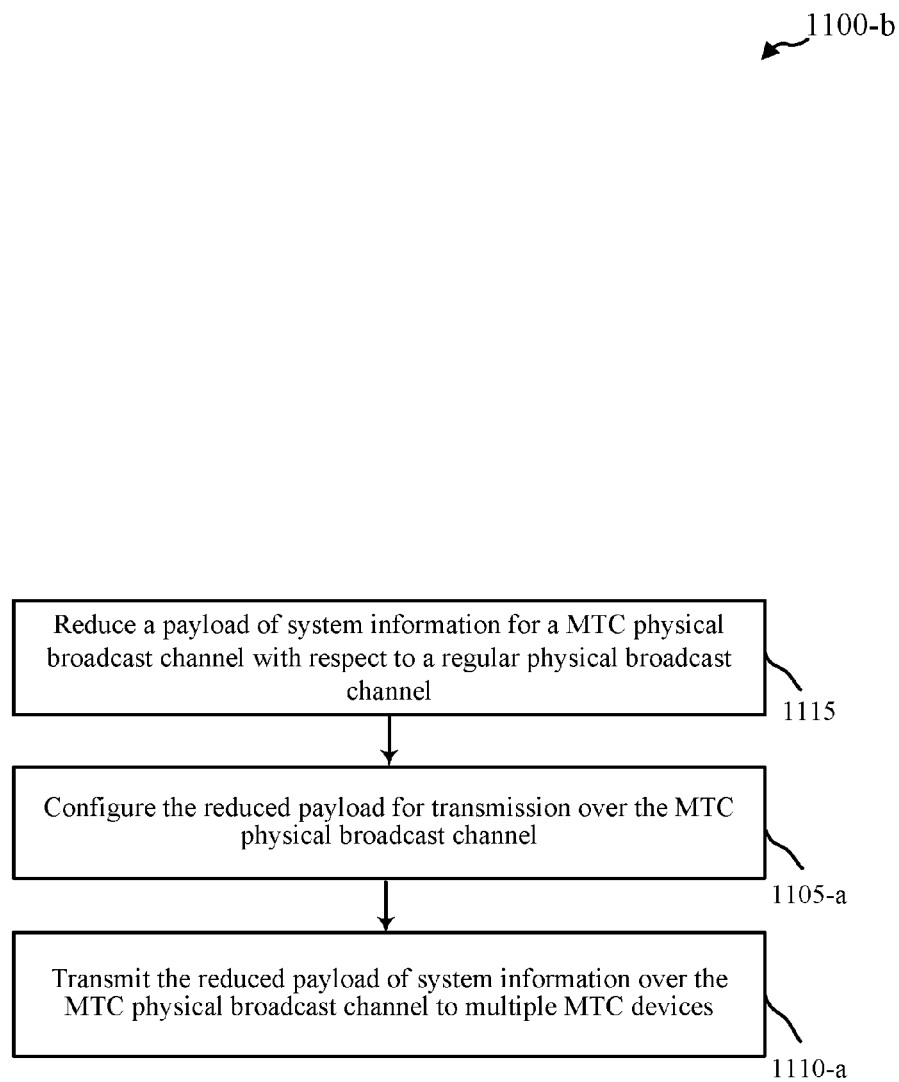
FIG. 11B is a flow chart illustrating an example of a method for facilitating Machine Type Communication in a wireless communications system in accordance with various embodiments.

FIG. 11B is a flow chart illustrating an example of a method 1100-*b* for facilitating Machine Type Communication (MTC) in a wireless communications system. For clarity, the method 1100-*b* is described below with reference to devices such as: the base stations 105 of FIG. 1, FIG. 2A, FIG. 2B, FIG. 8, and/or FIG. 10; and/or devices 300 of FIG. 3, FIG. 5, FIG. 6, and/or FIG. 7. In one implementation, a processor may execute one or more sets of codes to control the functional elements of the wireless device to perform the functions described below. Method 1100-*b* may be an example of method 1100-*a* of FIG. 11A.

At block 1115, a payload of system information for a MTC physical broadcast channel may be reduced with respect to a regular physical broadcast channel. The operations of block 1105 may be performed by the MTC information configuration module 320 of FIG. 3, the MTC physical broadcast channel module 320-*a* of FIG. 5, and/or the MTC-PBCH payload reduction module 322 of FIG. 5.

At block 1105-*a*, the reduced payload may be configured for transmission over the MTC physical broadcast channel. The operations of block 1105 may be performed by the MTC information configuration module 320 of FIG. 3, the MTC physical broadcast channel module 320-*a* of FIG. 5, and/or the MTC-PBCH configuration module 321 of FIG. 5.

At block 1110-*a*, the reduced payload of system information may be transmitted over the MTC physical broadcast channel to multiple MTC devices. In some cases, the operations of block 1110-*a* are performed by the transmitter 330 of FIG. 3 or 5.

Figure 12A:
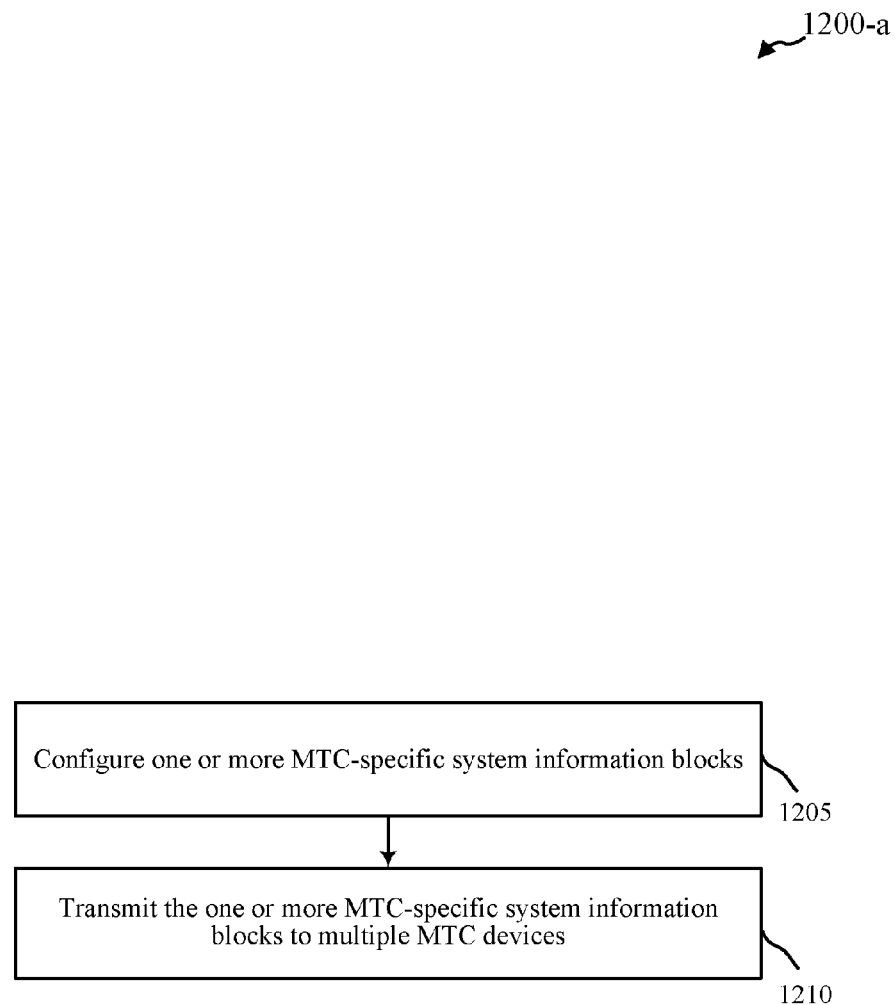
FIG. 12A is a flow chart illustrating an example of a method for facilitating Machine Type Communication in a wireless communications system in accordance with various embodiments.

FIG. 12A is a flow chart illustrating an example of a method 1200-*a* for facilitating Machine Type Communication (MTC) in a wireless communications system. For clarity, the method 1200-*a* is described below with reference to devices such as: the base stations 105 of FIG. 1, FIG. 2A, FIG. 2B, FIG. 8, and/or FIG. 10; and/or devices 300 of FIG. 3, FIG. 5, FIG. 6, and/or FIG. 7. In one implementation, a processor may execute one or more sets of codes to control the functional elements of the wireless device to perform the functions described below.

At block 1205, one or more MTC-specific system information blocks may be configured. The operations of block 1205 may be performed by the MTC information configuration modules 320 of FIG. 3, the MTC system information block module 320-*b* of FIG. 6, and/or the MTC-SIB configuration module 325 of FIG. 6. Configuring the one or more MTC-specific system information blocks may include combining at least a portion from each of multiple regular system information blocks into at least one of the one or more MTC-specific system information blocks. Combining at least the portion from each of the multiple regular system information blocks into at least one of the one or more MTC-specific system information blocks may include removing another portion from at least one of the multiple regular system information blocks.

Some embodiments of method 1200-*a* include utilizing one or more MTC fields as part of the one or more MTC-specific system information blocks to replace one or more regular fields from one or more of the multiple system information blocks. In some cases, the one or more MTC system information blocks are located at one or more predetermined locations. The one or more predetermined locations may be a function of at least a cell ID, a cyclic prefix length, or a division duplex configuration. Some embodiments include utilizing an MTC physical broadcast channel to convey information regarding one or more locations of the one or more MTC system information blocks.

At block 1210, the one or more MTC-specific system information blocks may be transmitted to multiple MTC devices. For example, the operations of block 1210 may be performed by the transmitters 330 of FIGS. 3 and 6.

Figure 12B:
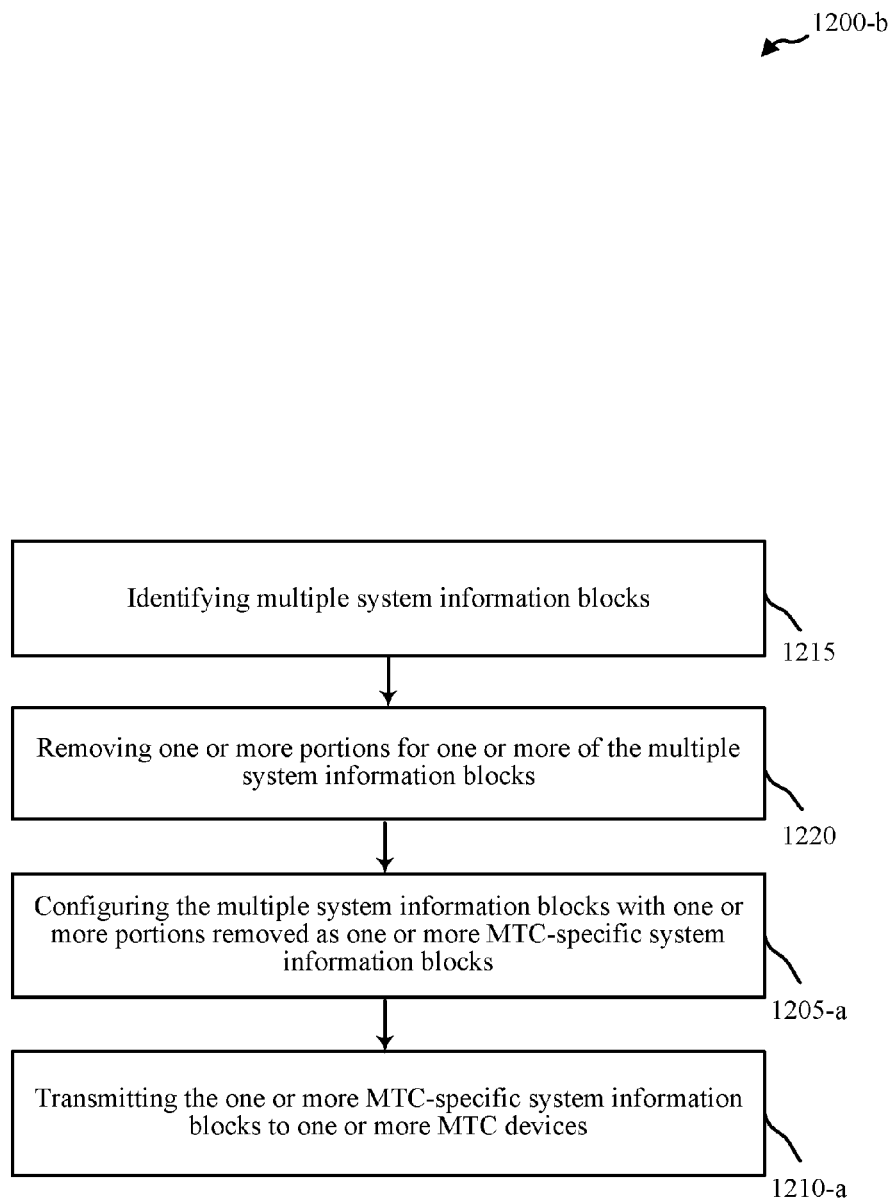
FIG. 12B is a flow chart illustrating an example of a method for facilitating Machine Type Communication in a wireless communications system in accordance with various embodiments.

FIG. 12B is a flow chart illustrating an example of a method 1200-*b* for facilitating Machine Type Communication (MTC) in a wireless communications system. For clarity, the method 1200-*b* is described below with reference to devices such as: the base stations 105 of FIG. 1, FIG. 2A, FIG. 2B, FIG. 8, and/or FIG. 10; and/or devices 300 of FIG. 3, FIG. 5, FIG. 6, and/or FIG. 7. In one implementation, a processor may execute one or more sets of codes to control the functional elements of the wireless device to perform the functions described below. Method 1200-*b* may be an example of method 1200-*a* of FIG. 12A.

At block 1215, multiple system information blocks may be identified. The operations of block 1215 may be performed by the MTC information configuration module 320 of FIG. 3, the MTC system information block module 320-*b* of FIG. 6, and/or the MTC-SIB configuration module 325 of FIG. 6.

At block 1220, one or more portions of one or more of the multiple system information blocks may be removed. The operations of block 1215 may be performed by the MTC information configuration module 320 of FIG. 3, the MTC system information block module 320-*b* of FIG. 6, and/or the MTC-SIB configuration module 325 of FIG. 6.

At block 1205-*a*, the multiple system information blocks with one or more portions removed may be configured as one more MTC-specific system information blocks. The operations of block 1215 may be performed by the MTC information configuration module 320 of FIG. 3, the MTC system information block module 320-*b* of FIG. 6, and/or the MTC-SIB configuration module 325 of FIG. 6.

At block 1210-*a*, the one or more MTC-specific system information blocks may be transmitted to one or more MTC devices. For example, the operations of block 1210 may be performed by the transmitters 330 of FIGS. 3 and 6.

Figure 13:
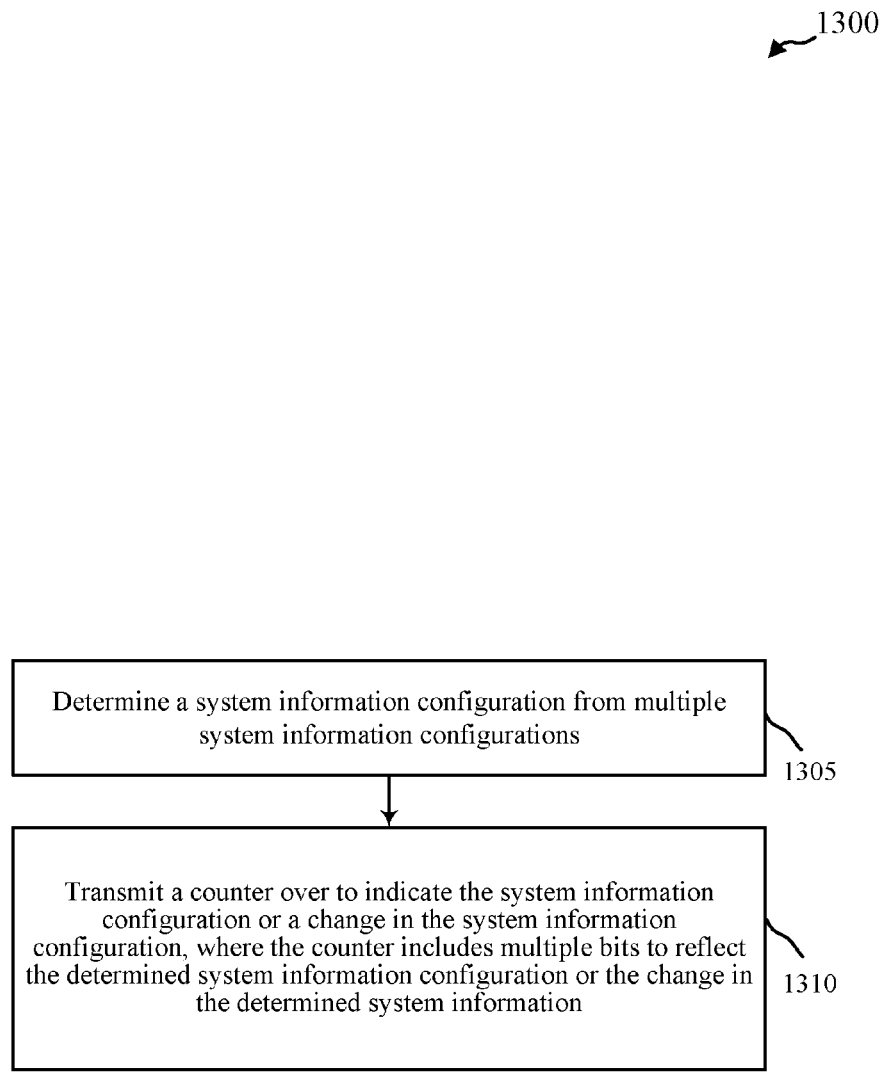
FIG. 13 is a flow chart illustrating an example of a method for facilitating Machine Type Communication in a wireless communications system in accordance with various embodiments.

FIG. 13 is a flow chart illustrating an example of a method 1300 for facilitating Machine Type Communication (MTC) in a wireless communications system. For clarity, the method 1300 is described below with reference to devices such as: the base stations 105 of FIG. 1, FIG. 2A, FIG. 2B, FIG. 8, and/or FIG. 10; and/or devices 300 of FIG. 3, FIG. 5, FIG. 6, and/or FIG. 7. In one implementation, a processor may execute one or more sets of codes to control the functional elements of the wireless device to perform the functions described below.

At block 1305, a system information configuration may be determined from multiple system information configurations. The operations of block 1305 are, in various embodiments, performed by the MTC information configuration module 320 of FIG. 3, the MTC system information indication module 320-*c* of FIG. 7, and/or the MTC-SIB determination module 327 of FIG. 7.

At block 1310, a counter may be transmitted to indicate the system information configuration or a change in the system information configuration. The counter may include multiple bits to reflect at least the determined system information configuration or the change in the determined system information. The operations of block 1310 may be performed by the transmitters 330 of FIGS. 3 and 7. In various embodiments, the counter may be transmitted over a paging channel, over PBCH, and/or over an MTC physical broadcast channel.

Figure 14A:
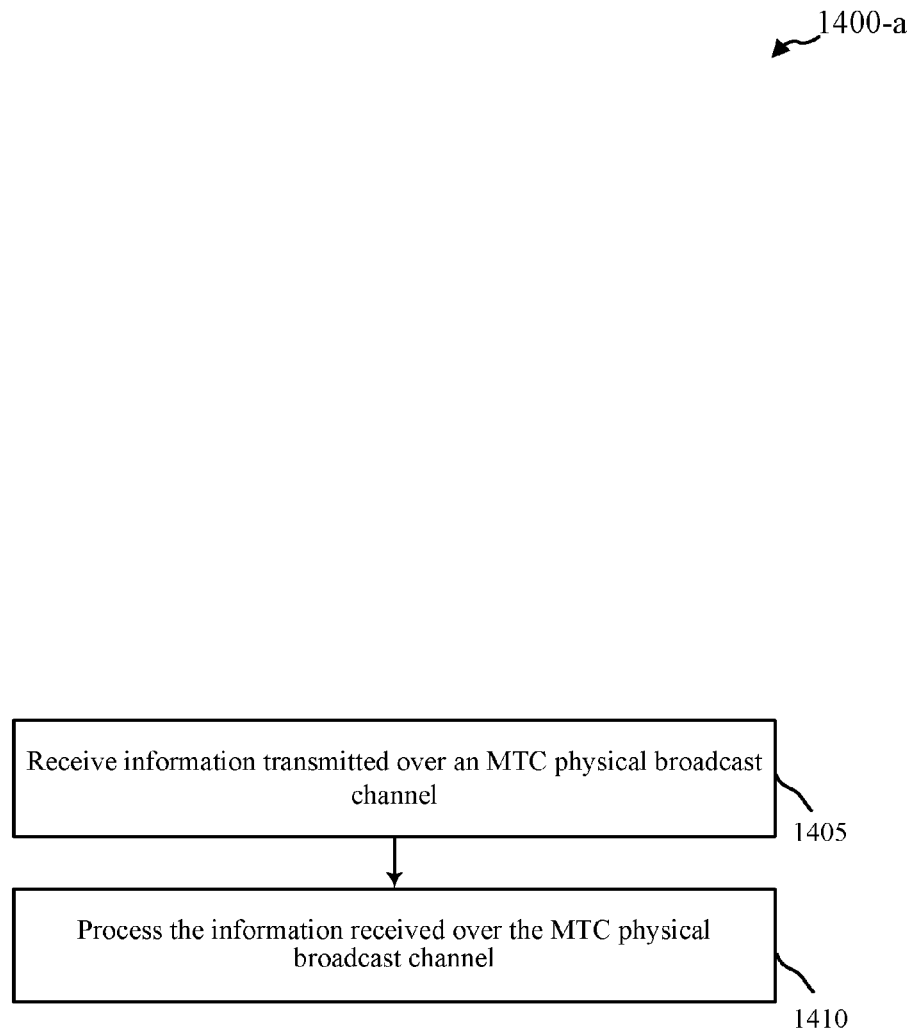
FIG. 14A is a flow chart illustrating an example of a method for facilitating Machine Type Communication in a wireless communications system in accordance with various embodiments.

FIG. 14A is a flow chart illustrating an example of a method 1400-*a* for facilitating Machine Type Communication (MTC) in a wireless communications system. For clarity, the method 1400-*a* is described below with reference to devices such as: the MTC devices 115 of FIG. 1, FIG. 2A, FIG. 2B, FIG. 8, and/or FIG. 10; and/or devices 400 of FIG. 4, FIG. 5, FIG. 6, and/or FIG. 7. In one implementation, a processor may execute one or more sets of codes to control the functional elements of the wireless device to perform the functions described below.

At block 1405, information transmitted over an MTC physical broadcast channel may be received. The operations of block 1405 may be performed by the receivers 410 of FIGS. 4 and 5. In some cases, the information transmitted over the MTC physical broadcast channel is received within a subframe separate from a regular physical broadcast channel. The information transmitted over the MTC physical broadcast channel may be received within a fifth subframe (SF5) of a frame and/or within the center six (6) RBs of the subframe. In some cases, the information may be received multiple times within a frame.

The information may include a reduced payload for the MTC physical broadcast channel with respect to a regular physical broadcast channel. The reduced payload for the MTC physical broadcast channel may include a reduced number of one or more bits utilized to reflect a downlink bandwidth, a system frame number, a physical hybrid ARQ indicator channel (PHICH) duration, a PHICH group, one or more reserved bits, or a cyclic redundancy check with respect to the regular physical broadcast channel.

In some cases, receiving the information transmitted over the MTC physical broadcast channel may include receiving a paging indicator to transmit over the MTC physical broadcast channel. The paging indicator may include an individual bit to indicate whether there is paging for at least one MTC device in some cases. The paging indicator may include multiple bits to indicate whether there is paging for multiple different paging groups. Additionally or alternatively, receiving the information transmitted over the MTC physical broadcast channel may include receiving a system information change indicator transmitted over the MTC physical broadcast channel. Receiving the information transmitted over the MTC physical broadcast channel at block 1405 may include receiving at least a PDCCH or an ePDCCH configuration indicator transmitted over the MTC physical broadcast channel At block 1410, the information received over the MTC physical broadcast channel may be processed. The operations of block 1410 are, in various embodiments, performed by the MTC information procession module 420 of FIG. 4, the MTC physical broadcast channel processing module 420-a of FIG. 5, and/or the MTC-PBCH information processing module of 421 of FIG. 5.

Method 1400-a may include receiving an MTC system information block location over the MTC physical broadcast channel. Method 1400-a may include receiving an MTC system frame number over the MTC physical broadcast channel. The MTC system frame number may map to a longer frame length than a regular system frame number.

Figure 14B:
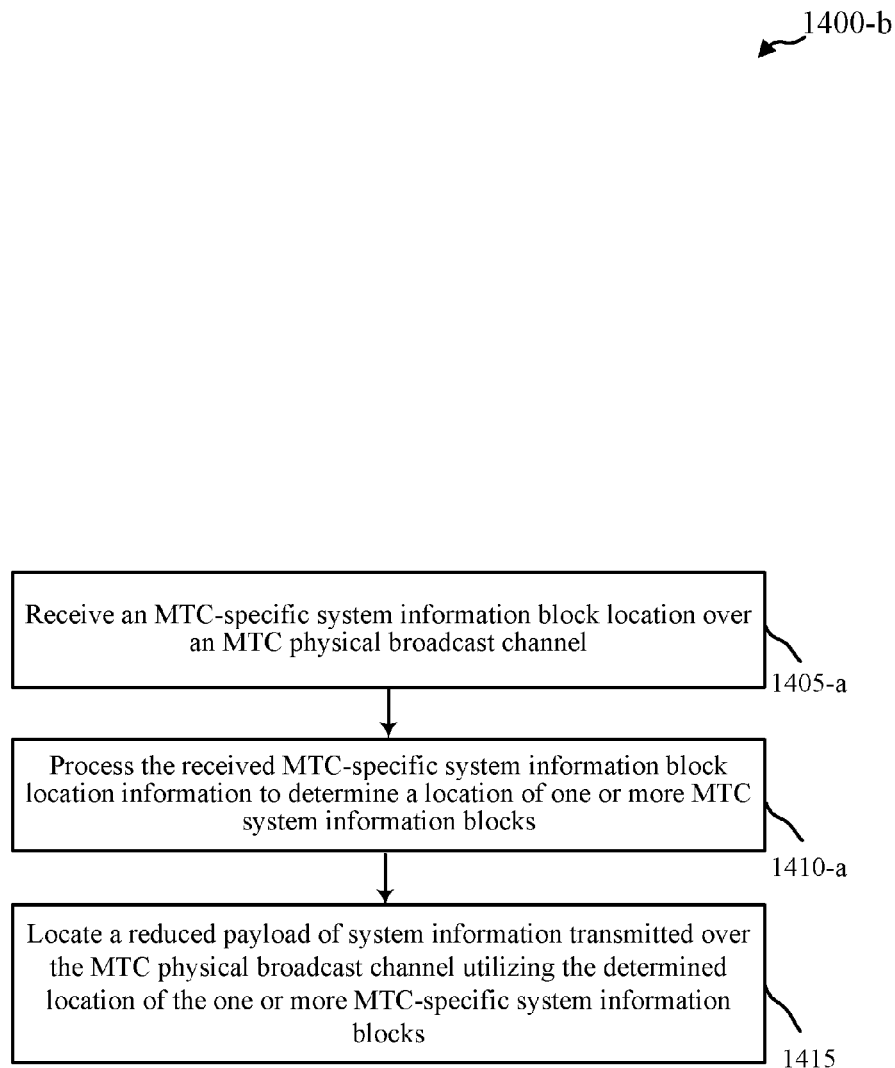
FIG. 14B is a flow chart illustrating an example of a method for facilitating Machine Type Communication in a wireless communications system in accordance with various embodiments.

FIG. 14B is a flow chart illustrating an example of a method 1400-b for facilitating Machine Type Communication (MTC) in a wireless communications system. For clarity, the method 1400-b is described below with reference to devices such as: the MTC devices 115 of FIG. 1, FIG. 2A, FIG. 2B, FIG. 8, and/or FIG. 10; and/or devices 400 of FIG. 4, FIG. 5, FIG. 6, and/or FIG. 7. In one implementation, a processor may execute one or more sets of codes to control the functional elements of the wireless device to perform the functions described below. Method 1400-b may be an example of method 1400-a of FIG. 14A.

At block 1405-a, an MTC-specific system information block location may be received over an MTC physical broadcast channel. The operations of block 1405-a may be performed by the receivers 410 of FIGS. 4 and 5. The MTC-specific system information blocks may be located at one or more predetermined locations, which may be a function of a cell ID, a cyclic prefix length, and/or a division duplex configuration.

At block 1410-a, the received MTC-specific system information block location information may be processed to determine a location of one or more MTC-specific system information blocks. The operations of block 1410-a are, in various embodiments, performed by the MTC information procession module 420 of FIG. 4, the MTC physical broadcast channel processing module 420-a of FIG. 5, and/or the MTC-PBCH information processing module of 421 of FIG. 5.

At block 1415, a reduced payload of system information transmitted over the MTC physical broadcast channel may be located utilizing the determined location of the one or more MTC system information blocks. In various embodiments, the operations of block 1415 are performed by the MTC information processing module 420 of FIG. 4, the MTC system information block module 420-b of FIG. 6, and/or the MTC-SIB location determination module 426 of FIG. 6.

Figure 15A:
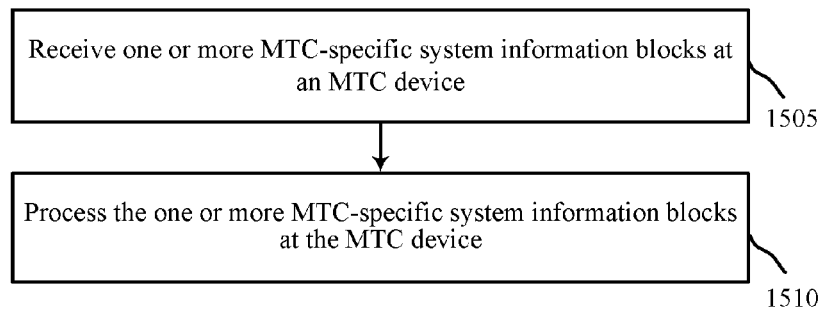
FIG. 15A is a flow chart illustrating an example of a method for facilitating Machine Type Communication in a wireless communications system in accordance with various embodiments.

FIG. 15A is a flow chart illustrating an example of a method 1500-a for facilitating Machine Type Communication (MTC) in a wireless communications system. For clarity, the method 1500-a is described below with reference to devices such as: the MTC devices 115 of FIG. 1, FIG. 2A, FIG. 2B, FIG. 8, and/or FIG. 10; and/or devices 400 of FIG. 4, FIG. 5, FIG. 6, and/or FIG. 7. In one implementation, a processor may execute one or more sets of codes to control the functional elements of the wireless device to perform the functions described below.

At block 1505, one or more MTC system information blocks may be received at an MTC device. The operations of block 1505 may be performed by the receivers of FIGS. 4 and 6.

At block 1510, the one or more MTC system information blocks may be processed at the MTC device. In various embodiments, the operations of block 1510 may be performed by the MTC information processing module 420 of FIG. 4, the MTC system information block module 420-b of FIG. 6, and/or the MTC-SIB information processing module 425 of FIG. 6.

The MTC-specific system information blocks may include a combination of system information included in two or more other system information blocks. For example, an MTC-specific system information block may include aspects of SIB1, SIB2, and/or SIB12. Additionally or alternatively, an MTC-specific system information block may consist of a subset of system information included in one other system information block, such as SIB1, SIB2, or SIB12.

In some embodiments, an MTC-specific system information block includes fields for cell access information, scheduling information for other SIBs, and radio resource configuration information. In other cases, an MTC-specific system information block includes fields for cell access information and cell selection information, or fields for scheduling information for other system information blocks. In still other embodiments, an MTC-specific system information block includes MTC RACH configuration information or MTC paging channel configuration information. Or an MTC-specific system information block may consist of fields for PUSCH configuration information, power control, and a timer. In other embodiments, an MTC-specific system information block includes fields for radio resource configuration information other than PUSCH configuration information and SRS configuration information.

In some cases, the one or more MTC-specific system information blocks may be located at one or more predetermined locations. The one or more predetermined locations may be a function of at least a cell ID, a cyclic prefix length, a division duplex configuration. Some embodiments of method 1500-*a* include receiving information regarding one or more locations of the one or more MTC-specific system information blocks over an MTC physical broadcast channel.

Figure 15B:
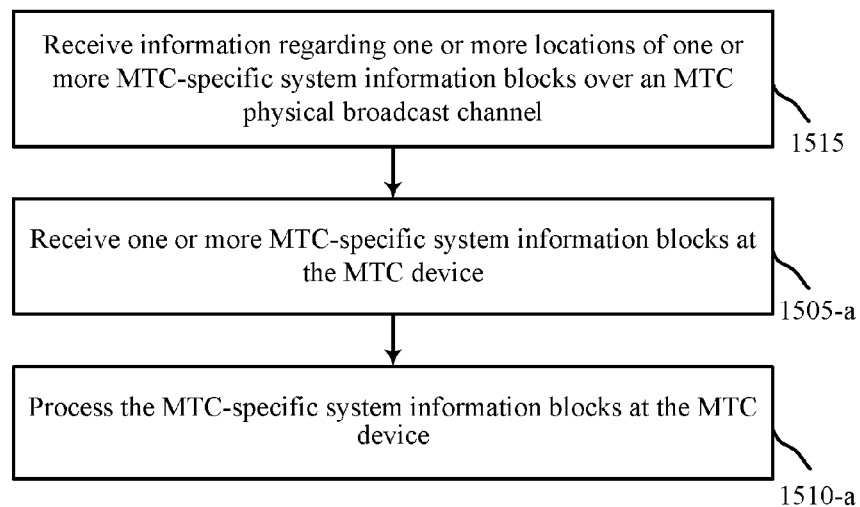
FIG. 15B is a flow chart illustrating an example of a method for facilitating Machine Type Communication in a wireless communications system in accordance with various embodiments.

FIG. 15B is a flow chart illustrating an example of a method 1500-*b* for facilitating Machine Type Communication (MTC) in a wireless communications system. For clarity, the method 1500-*b* is described below with reference to devices such as: the base stations 105 of FIG. 1, FIG. 2A, FIG. 2B, FIG. 8, and/or FIG. 10; and/or devices 300 of FIG. 3, FIG. 5, FIG. 6, and/or FIG. 7. In one implementation, a processor may execute one or more sets of codes to control the functional elements of the wireless device to perform the functions described below. Method 1200-*b* may be an example of method 1500-*a* of FIG. 15C.

At block 1515, an MTC device may receive information regarding one or more locations of one or more MTC-specific system information blocks over an MTC physical broadcast channel. The operations of block 1515 may be performed by the receivers 410 of FIGS. 4 and 5. The MTC-specific system information blocks may be located at one or more predetermined locations, which may be a function of a cell ID, a cyclic prefix length, and/or a division duplex configuration.

At block 1505-*a*, one or more MTC system information blocks may be received at an MTC device. The operations of block 1505-*a* may be performed by the receivers of FIGS. 4 and 6.

At block 1510-*a*, the one or more MTC system information blocks may be processed at the MTC device. In various embodiments, the operations of block 1510-*a* may be performed by the MTC information processing module 420 of FIG. 4, the MTC system information block module 420-*b* of FIG. 6, and/or the MTC-SIB information processing module 425 of FIG. 6.

Figure 16:
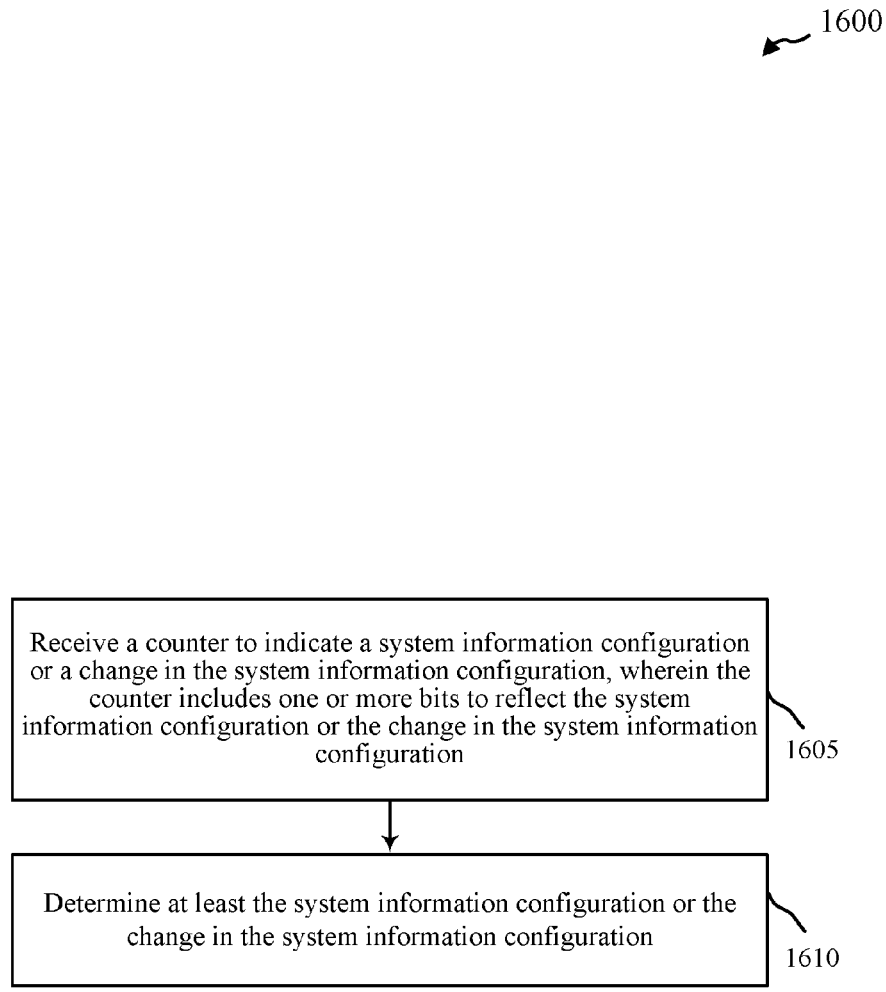
FIG. 16 is a flow chart illustrating an example of a method for facilitating Machine Type Communication in a wireless communications system in accordance with various embodiments.

FIG. 16 is a flow chart illustrating an example of a method 1600 for facilitating Machine Type Communication (MTC) in a wireless communications system. For clarity, the method 1600 is described below with reference to devices such as: the MTC devices 115 of FIG. 1, FIG. 2A, FIG. 2B, FIG. 8, and/or FIG. 10; and/or devices 400 of FIG. 4, FIG. 5, FIG. 6, and/or FIG. 7. In one implementation, a processor may execute one or more sets of codes to control the functional elements of the wireless device to perform the functions described below.

At block 1605, a counter may be received to indicate a system information configuration or a change in the system information configuration. The counter may include one or more bits to reflect the system information configuration or the change in the system information configuration. The operations of block 1605 may be performed by the receivers 410 of FIGS. 4 and 7. The counter may include four (4) bits mapping to sixteen (16) different system information locations. In various embodiments, the counter may be received over a paging channel, over PBCH, or over an MTC physical broadcast channel. In some cases, the counter is received in a SIB, such as an MTC-specific SIB.

At block 1610, the system information configuration or the change in the system information configuration may be determined utilizing the counter received over the paging channel. The operations of block 1610 may be performed by the MTC information processing module 420 of FIG. 4, the MTC system information update determination module 420-*c* of FIG. 7, and/or the MTC-SIB update counter determination module 428 of FIG. 7. Determining the change in the system information configuration may include determining that the receiver counter is different from a previous wake up. For example, determining the received counter is different from a previous wake up may include receiving an incremented counter. Additionally or alternatively, determining the system information configuration or the change in system information configuration may include determining the system information changed based on the counter and identifying updated system information based on the counter.

Figure 17:
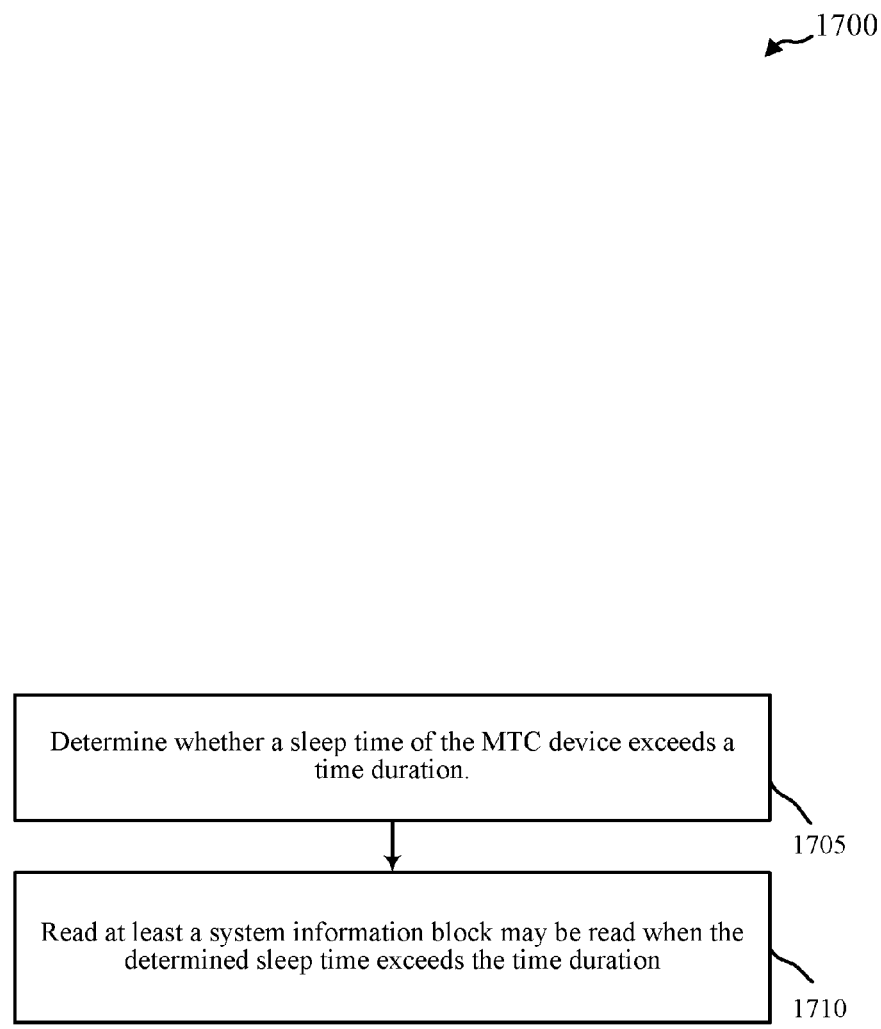
FIG. 17 is a flow chart illustrating an example of a method for facilitating Machine Type Communication in a wireless communications system in accordance with various embodiments.

FIG. 17 is a flow chart illustrating an example of a method 1700 for facilitating Machine Type Communication (MTC) in a wireless communications system. For clarity, the method 1700 is described below with reference to devices such as: the MTC devices 115 of FIG. 1, FIG. 2A, FIG. 2B, FIG. 8, and/or FIG. 10; and/or devices 400 of FIG. 4, FIG. 5, FIG. 6, and/or FIG. 7. In one implementation, a processor may execute one or more sets of codes to control the functional elements of the wireless device to perform the functions described below.

At block 1705, it may be determined at an MTC device whether a sleep time of the MTC device exceeds a time duration. The operations of block 1705 are, in various embodiments, performed by the MTC information processing module 420 of FIG. 4, the MTC system information update determination module 420-*c* of FIG. 7, and/or the MTC timing module 427 of FIG. 7.

At block 1710, at least a system information block may be read when the determined sleep time exceeds the time duration. The operations of block 1705 are, in various embodiments, performed by the MTC information processing module 420 of FIG. 4, the MTC system information update determination module 420-*c* of FIG. 7, and/or the MTC timing module 427 of FIG. 7.

In some embodiments, the method 1700 is an example of the method 1500-*a*. For example, an MTC device may perform the operations of blocks 1705 and 1710 before performing the operations of blocks 1505 and 1510.

Those skilled in the art will recognize that the methods 1100, 1200, 1300, 1400, 1500, 1600, and 1700 are example implementations of the tools and techniques described herein. The methods may be performed with more or fewer steps; and they may be performed in an order other than indicated.

The detailed description set forth above in connection with the appended drawings describes exemplary embodiments and does not represent the only embodiments that may be implemented or that are within the scope of the claims. The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method for facilitating Machine Type Communication (MTC) in a wireless communications system, comprising:

configuring an MTC-specific system information block that comprises first system information included in a first system information block and second system information included in a second system information block, wherein the first system information block and the second system information block are each selected from a group that consists of system information block 1 (SIB1), system information block 2 (SIB2), and system information block 12 (SIB12); and transmitting the MTC-specific system information block to a plurality of MTC devices.

2. The method of claim 1, wherein the MTC-specific system information block comprises fields for:

cell access information, scheduling information for other system information blocks, and radio resource configuration information.

3. The method of claim 1, wherein the MTC-specific system information block comprises:

fields for cell access information and cell selection information; or fields for scheduling information for other system information blocks.

4. The method of claim 1, wherein the MTC-specific system information block comprises fields for:

MTC random access channel (RACH) configuration information or MTC paging channel configuration information.

5. The method of claim 1, wherein the MTC-specific system information block consists of fields for:

physical uplink shared channel (PUSCH) configuration information, power control, and a timer.

6. The method of claim 1, wherein the MTC-specific system information block comprises:

fields for radio resource configuration information other than physical uplink control channel (PUSCH) configuration information and sounding reference signal (SRS) configuration information.

7. The method of claim 1, wherein the MTC-specific system information block is located at one or more predetermined locations.

8. The method of claim 7, wherein the one or more predetermined locations are a function of a cell ID, a cyclic prefix length, and a carrier configuration.

9. The method of claim 1, further comprising:

transmitting information regarding one or more locations of the MTC-specific system information block over an MTC physical broadcast channel.

10. An apparatus for facilitating Machine Type Communication (MTC) in a wireless communications system, comprising:

means for configuring an MTC-specific system information block that comprises first system information included in a first system information block and second system information included in a second system information block, wherein the first system information block and the second system information block are each selected from a group that consists of system information block 1 (SIB1), system information block 2 (SIB2), and system information block 12 (SIB12); and a transceiver configured to transmit the MTC-specific system information block to a plurality of MTC devices.

11. An apparatus for facilitating Machine Type Communication (MTC) in a wireless communications system, comprising:

a processor;

memory in electronic communication with the processor; and instructions stored in the memory, the instructions being executable by the processor to cause the apparatus to:

configure an MTC-specific system information block that comprises first system information included in a first system information block and second system information included in a second system information block, wherein the first system information block and the second system information block are each selected from a group that consists of system information block 1 (SIB1), system information block 2 (SIB2), and system information block 12 (SIB12); and transmit the MTC-specific system information block.

12. The apparatus of claim 11, wherein the MTC-specific system information block comprises fields for:

cell access information, scheduling information for other system information blocks, and radio resource configuration information.

13. The apparatus of claim 11, wherein the MTC-specific system information block comprises:

fields for cell access information and cell selection information; or fields for scheduling information for other system information blocks.

14. The apparatus of claim 11, wherein the MTC-specific system information block comprises fields for:

MTC random access channel (RACH) configuration information or MTC paging channel configuration information.

15. The apparatus of claim 11, wherein the MTC-specific system information block consists of fields for:

physical uplink shared channel (PUSCH) configuration information, power control, and a timer.

16. The apparatus of claim 11, wherein the MTC-specific system information block comprises:

fields for radio resource configuration information other than physical uplink control channel (PUSCH) configuration information and sounding reference signal (SRS) configuration information.

17. The apparatus of claim 11, wherein the MTC-specific system information block is located at one or more predetermined locations.

18. The apparatus of claim 17, wherein the one or more predetermined locations are a function of a cell ID, a cyclic prefix length, and a carrier configuration.

19. The apparatus of claim 11, wherein the instructions are executable by the processor to cause the apparatus to:

transmit information regarding one or more locations of the MTC-specific system information block over an MTC physical broadcast channel.

20. A non-transitory computer-readable medium storing code for Machine Type Communication (MTC) in a wireless communications system, the code comprising instructions executable to:

transmit an MTC-specific system information block that comprises first system information included in a first system information block and second system information included in a second system information block, wherein the first system information block and the second system information block are each selected from a group that consists of system information block 1 (SIB1), system information block 2 (SIB2), and system information block 12 (SIB12); and transmit the MTC-specific system information block to a plurality of MTC devices.

\* \* \* \* \*